United States Patent
Lee et al.

(10) Patent No.: US 10,432,909 B2
(45) Date of Patent: Oct. 1, 2019

(54) DIGITAL SIGNAGE SYSTEM AND DATA PROCESSING METHOD IN THE SAME

(71) Applicant: LG ELECTRONICS INC., Seoul (KR)

(72) Inventors: Sangmin Lee, Seoul (KR); Jiwoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 15/685,298

(22) Filed: Aug. 24, 2017

(65) Prior Publication Data

US 2018/0160096 A1 Jun. 7, 2018

(30) Foreign Application Priority Data

Dec. 6, 2016 (KR) ........................ 10-2016-0164925

(51) Int. Cl.
*H04N 13/00* (2018.01)
*H04N 13/167* (2018.01)
*H04N 13/161* (2018.01)
*H04N 19/597* (2014.01)

(52) U.S. Cl.
CPC ......... *H04N 13/167* (2018.05); *H04N 13/161* (2018.05); *H04N 19/597* (2014.11); *H04N 2013/0096* (2013.01)

(58) Field of Classification Search
CPC .. H04N 13/167; H04N 13/161; H04N 19/597; H04N 2013/0096; H04N 13/395; H04N 13/388

USPC ........................................................... 348/55
See application file for complete search history.

(56) References Cited

U.S. PATENT DOCUMENTS

| | | | |
|---|---|---|---|
| 2004/0135741 A1* | 7/2004 | Tomisawa | H04N 13/398 345/6 |
| 2006/0133047 A1 | 6/2006 | Tomizuka et al. | |
| 2010/0156922 A1* | 6/2010 | Bell | G09G 3/003 345/589 |
| 2012/0327082 A1* | 12/2012 | Kim | G02B 27/2278 345/419 |
| 2016/0260258 A1* | 9/2016 | Lo | G06T 7/00 |

FOREIGN PATENT DOCUMENTS

| | | |
|---|---|---|
| EP | 2309768 A2 | 4/2011 |
| EP | 2743906 A1 | 6/2014 |
| WO | WO 2012/058150 A1 | 5/2012 |

* cited by examiner

*Primary Examiner* — Jared Walker
(74) *Attorney, Agent, or Firm* — Birch, Stewart, Kolasch & Birch, LLP

(57) ABSTRACT

A digital signage system including a first display device; a second display device arranged a first spatial interval from the first display device and having a display screen that at least partially overlaps a display screen on the first display device; and a controller configured to control the first display device to display single image data at a first time, and control the second display device to display the single image data at a second time based on the first spatial interval between the first display device and the second display device. Further, at least one of the first display device and the second display device is a transparent display.

16 Claims, 20 Drawing Sheets

FIG. 8
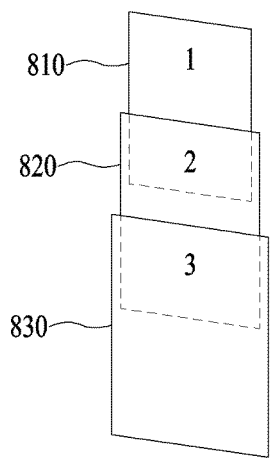
(a)
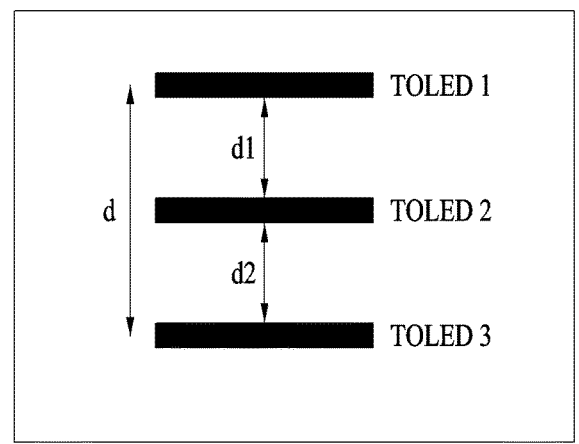
(b)

FIG. 10
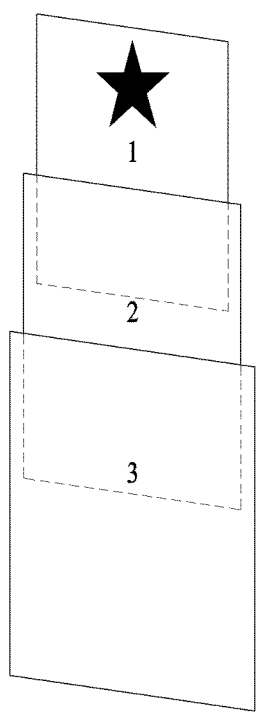
(a)
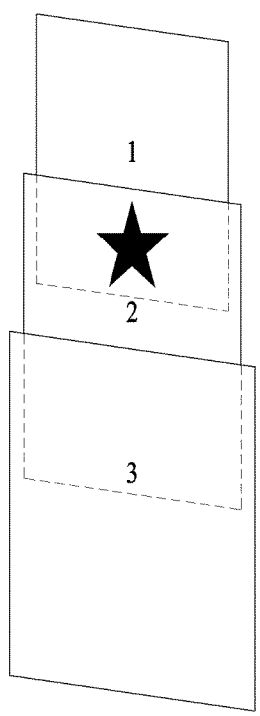
(b)
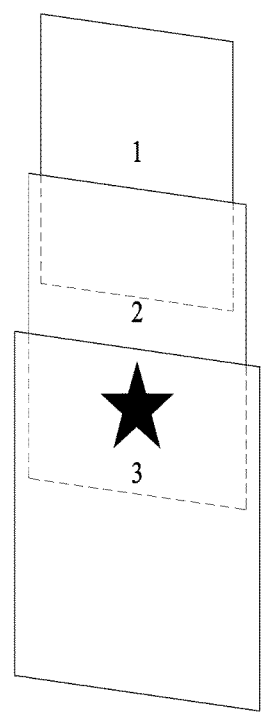
(c)

FIG. 11
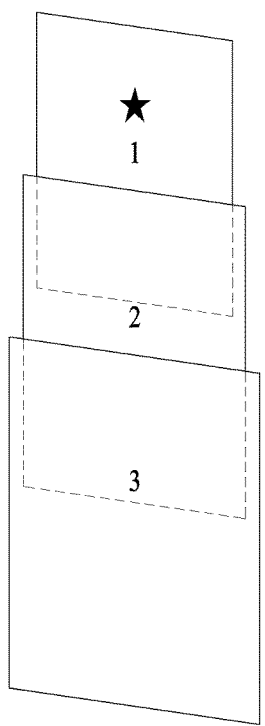 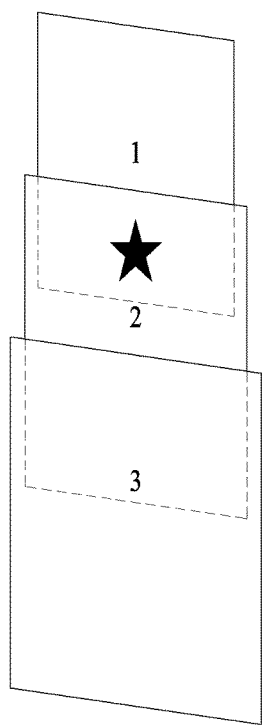 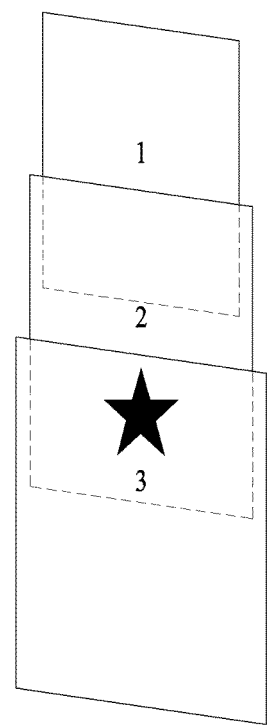
(a)  (b)  (c)

FIG. 12
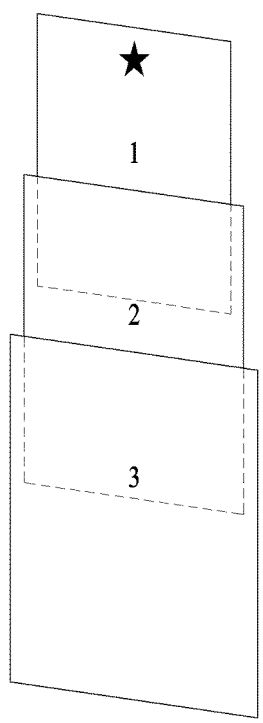
(a)
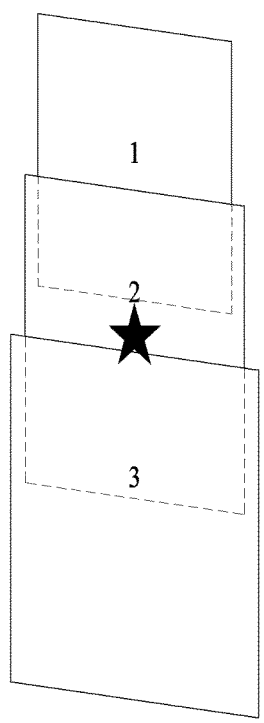
(b)
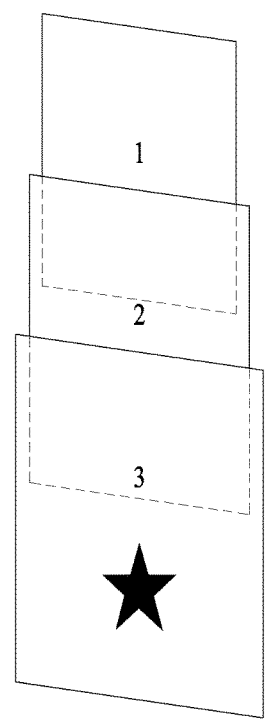
(c)

FIG. 15
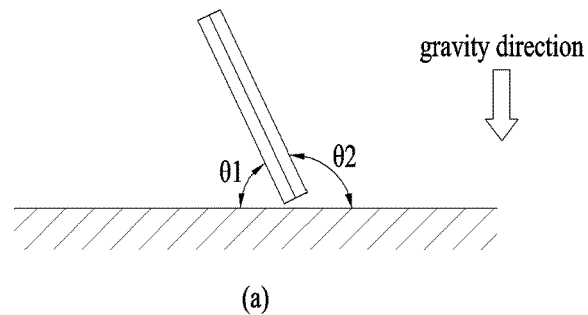
(a)
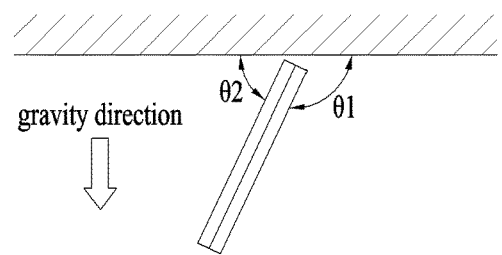
(b)
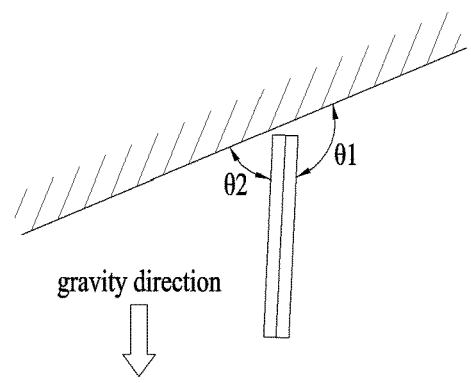
(c)

FIG. 16
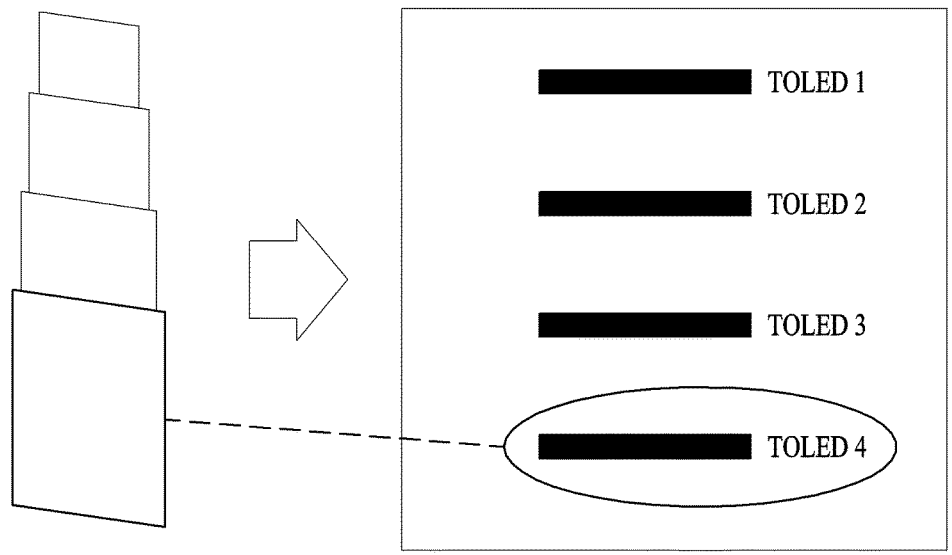
(a)
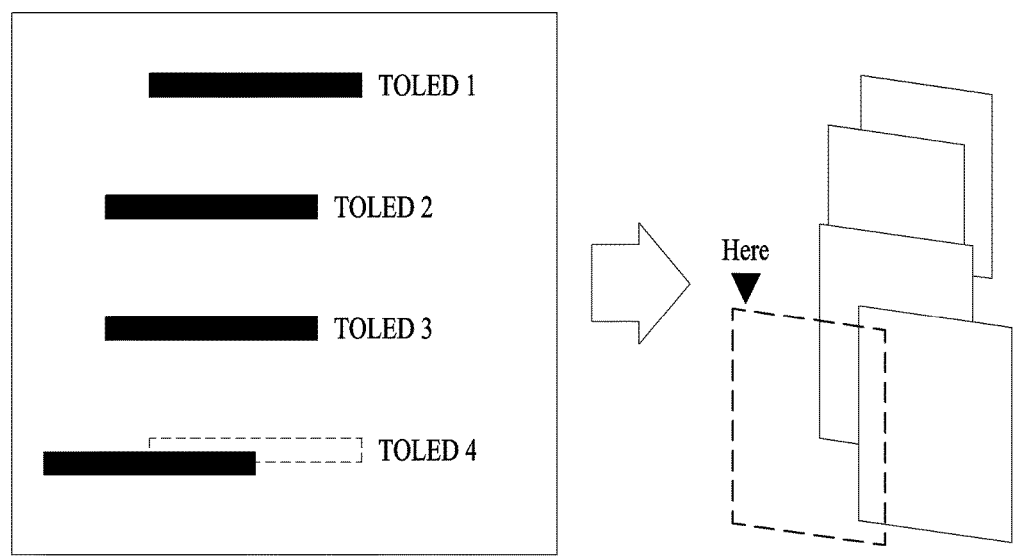
(b)

FIG. 17
(a) 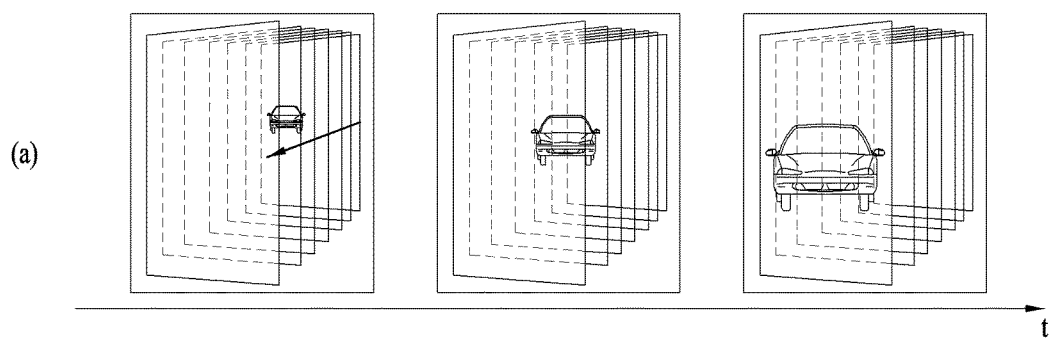
(b) 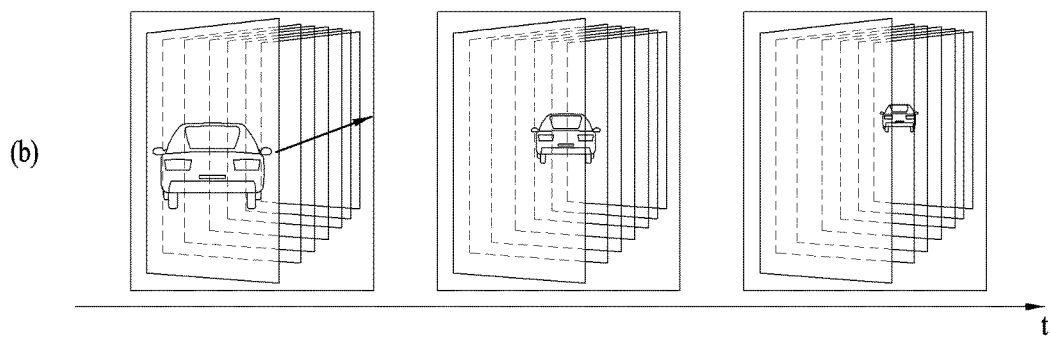

DIGITAL SIGNAGE SYSTEM AND DATA PROCESSING METHOD IN THE SAME

CROSS-REFERENCE TO RELATED APPLICATIONS

Pursuant to 35 U.S.C. § 119(a), this application claims the benefit of earlier filing date and right of priority to Korean Application No. 10-2016-0164925, filed on Dec. 6, 2016, the contents of which are hereby incorporated by reference herein in their entirety.

BACKGROUND OF THE INVENTION

Field of the Invention

The present invention relates to a digital signage system, and more particularly, to a digital signage system configured by digital signages including a plurality of display devices having a transparent display and a data processing method in the same.

Discussion of the Related Art

With the development of the information age, a demand for a display device has been increased in various forms. Therefore, various display devices such as LCD (Liquid Crystal Display) device, PDP (Plasma Display Panel), ELD (Electro Luminescent Display), VFD (Vacuum Fluorescent Display), and OLED (Organic Light Emitting Diode) have been studied and used. The display devices may be used in various fields such as TV, mobile device, etc. Particularly, the display devices are recently be used as digital signage.

However, a related art digital signage system outputs a signage content onto a digital signage under the control of a server. Further, even though the digital signage is configured by only one display device or a plurality of display devices, each display device is horizontally and simply listed to display the signage content two-dimensionally. However, at the time when an available area of the digital signage is gradually increased, this scheme for providing information two-dimensionally through the digital signage has a problem in that the digital signage has a limitation and its applicability is reduced.

SUMMARY OF THE INVENTION

Accordingly, one object of the present invention is to address the above-noted and other problems.

Another object of the present invention is to provide a digital signage system that provides a stereoscopic signage content having depth and the immersion level unlike the related art digital signage system that only provides two-dimensional signage information.

Another object of the present invention is to actively control a digital signage by controlling a signage content in response to various events such as movement of display devices.

Yet another object of the present invention is to maximize an effect of a digital signage by implementing a digital signage system as above.

The technical objects that can be achieved through the present invention are not limited to what has been particularly described hereinabove and other technical objects not described herein will be more clearly understood by persons skilled in the art from the following detailed description.

This specification discloses a digital signage system and a data processing method in the same.

To achieve these objects and other advantages and in accordance with the purpose of the specification, as embodied and broadly described herein, a digital signage system according to one embodiment of the present invention comprises a plurality of display devices displaying a signage content; and a server including a communication unit for transmitting signage content data to each display device, a sensor unit for sensing movement of the plurality of display devices, and a controller for controlling the display devices of which display areas are overlapped, differently from each other based on the sensed movement data of the display devices, if display areas of at least two of the plurality of display devices are overlapped with each other at a predetermined threshold value or more.

In another aspect of the present invention, a digital signage system according to another embodiment of the present invention comprises a plurality of display devices of which display areas are arranged to be overlapped, only a first display device of the plurality of display devices displaying an image in a first mode; and a server including a sensor unit, a communication unit for transmitting image data to at least one of the display devices, and a controller for controlling an image data display time of each display device to allow an image data display time interval of each display device to reach a value less than a predetermined threshold value if the first mode is changed to a second mode as a result of sensing of the sensor unit.

The above technical solutions are merely some parts of the embodiments of the present invention and various embodiments into which the technical features of the present invention are incorporated can be derived and understood by persons skilled in the art from the following detailed description of the present invention.

According to an embodiment of the present invention, the following advantageous effects can be obtained.

According to at least one of the embodiments of the present invention, a digital signage system that provides a stereoscopic signage content having depth and the immersion level may be provided unlike the related art digital signage system that only provides two-dimensional signage information.

According to at least one of the embodiments of the present invention, it is possible to actively control a digital signage by controlling a signage content in response to various events such as movement of display devices.

According to at least one of the embodiments of the present invention, it is possible to maximize an effect of a digital signage by implementing a digital signage system as above.

The effects that can be achieved through the present invention are not limited to what has been particularly described hereinabove and other effects not described herein will be more clearly understood by persons skilled in the art from the following detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 8 is a view illustrating a function of a controller of a digital signage system according to one embodiment of the present invention;

FIGS. 10 to 12 are views illustrating an image display time interval in a display device according to the embodiment of the present invention;

FIGS. 13 to 16 are views illustrating a method for controlling a display device according to events of a digital signage system in accordance with one embodiment of the present invention;

FIG. 17 is a view illustrating an effect of apparent movement through display devices of a digital signage system according to one embodiment of the present invention;

DETAILED DESCRIPTION OF THE PREFERRED EMBODIMENTS

Figure 1:
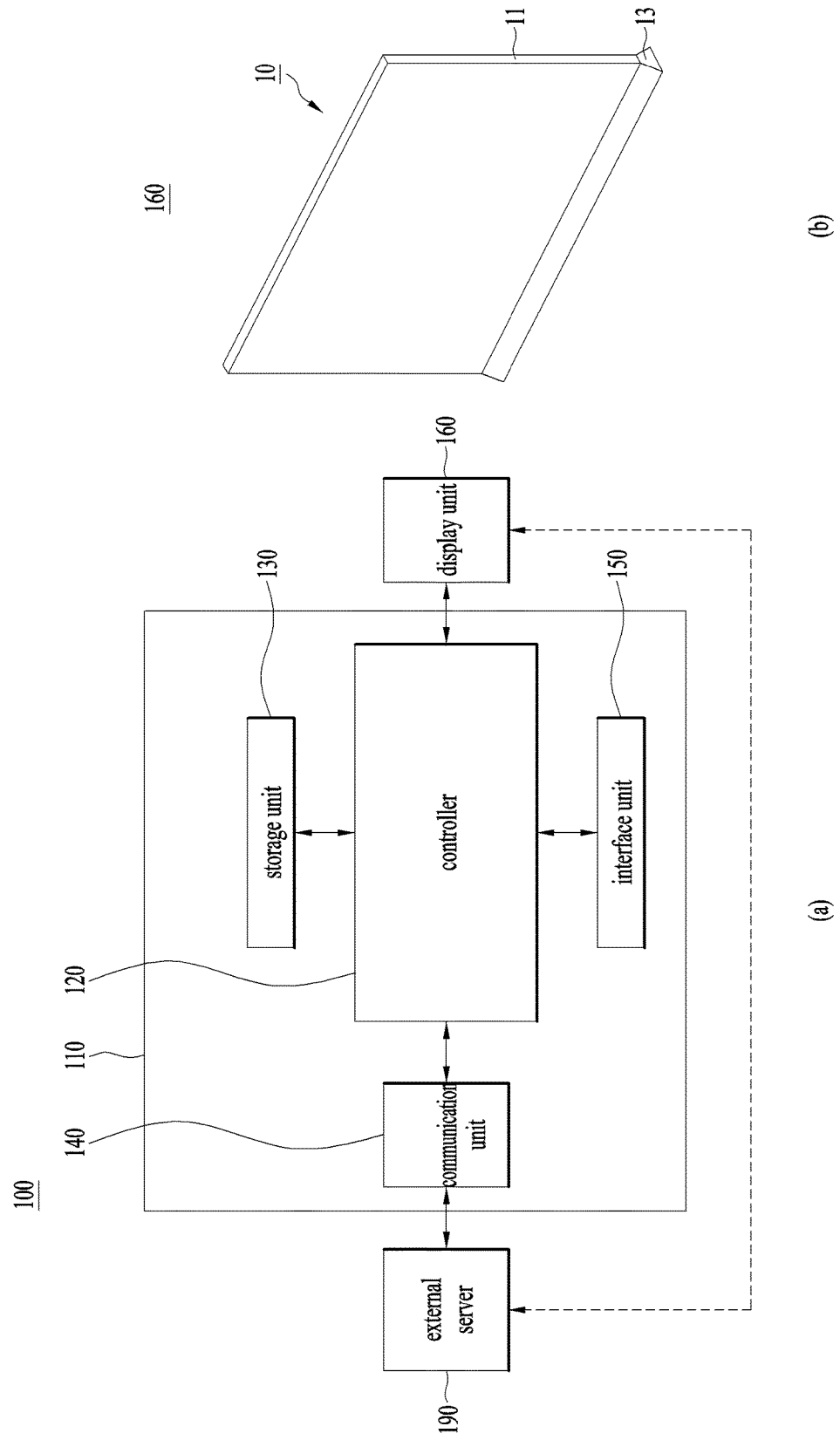
FIG. 1 is a view illustrating a digital signage system configured according to one embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. The suffixes "module" and "unit" for the elements used in the following description are given or used in common by considering facilitation in writing this disclosure only but fail to have meanings or roles discriminated from each other.

Also, in description of the embodiments disclosed in this specification, if detailed description of the disclosure known in respect of the present invention is determined to make the subject matter of the embodiments disclosed in this specification obscure, the detailed description will be omitted. Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present invention.

Although the terms such as "first" and/or "second" in this specification may be used to describe various elements, it is to be understood that the elements are not limited by such terms. The terms may be used to identify one element from another element. The expression that an element is "connected" or "coupled" to another element should be understood that the element may directly be connected or coupled to another element, a third element may be interposed between the corresponding elements, or the corresponding elements can be connected or coupled to each other through a third element. Further, the expression that an element is "directly connected" or "directly coupled" to another element" means that no third element exists therebetween.

It is to be understood that the singular expression used in this specification includes the plural expression unless defined differently on the context. In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

A digital signage system described in this specification may include an indoor signboard, a digital video output device, a digital video display device, a digital TV, a desktop computer, etc. However, it will easily be apparent to those skilled in the art that the elements according to the embodiment disclosed in this specification may be applied to mobile terminals such as a cellular phone, a smart phone, a laptop computer, a digital broadcast terminal, a PDA (personal digital assistants), a PMP (portable multimedia player), a navigator, a slate PC, a tablet PC, an ultrabook, and a wearable device (for example, watch type terminal (smart watch), smart glasses, HMD (head mounted display)), except for the case applicable to digital signage only.

Hereinafter, in this specification, a digital signage system and a data processing method in the digital signage system according to an embodiment of the present invention will be described with reference to the accompanying drawings. In particular, FIG. 1(*a*) is a functional block diagram illustrating a digital signage system according to one embodiment of the present invention, and FIG. 1(*b*) briefly illustrates a display in a digital signage system according to one embodiment of the present invention.

The digital signage system 100 according to an embodiment of the present invention includes a server 110 and a display unit 160. The display unit 160 may include at least two or more display units or a plurality of display units, where the respective display units do not need to have the same type or attribute.

Further, the other component module except the display unit 160 in the digital signage system, that is, the server 110 may be implemented as one device depending on the system. The digital signage system may further include an external server 190 depending on the system. Some component modules may be added to or modified in the digital signage system shown in FIG. 1(*a*).

The server 110 of the digital signage system includes a controller 120, a storage unit 130, a communication unit 140, a camera unit, and an interface unit 150. The communication unit 140 can receive a signage content not the signage content self-manufactured or previously stored from the external server 190 through a network. Further, the signage content may be in the form of service, application, media data, image, etc. In addition, the communication unit 140 can be implemented as at least one of a tuner, a network interface unit, and a wireless communication unit. The communication unit 140 can also deliver a predetermined signage content to the display device under the control of the controller 120 or provide an interface environment for the predetermined signage content.

Further, the interface unit 150 can receive a specific command from a user. The interface unit 150 can receive a control signal for controlling the digital signage system 100 from a remote controller, or can receive a control signal for controlling the digital signage system 100 through a touch screen when the display unit 160 includes the touch screen. Also, the interface unit 150 can be connected with a user input unit to receive a specific signal transmitted from the user input unit. Also, the interface unit 150 can be connected with an external device to transmit or receive data to or from the external device.

The storage unit 130 stores various programs, applications, algorithms, content production tools, which are used for an operation of the digital signage system 100. The storage unit 130 also stores a signage content received through the communication unit 140. In addition, the controller 120 controls the operation of the digital signage system 100, and manages and controls the overall digital signage system 100 such as the display unit 160, the storage unit 130, the communication unit 140, the camera unit and the interface unit 150. The controller 120 may include a decoder for processing video data and audio data of the signage content received through the communication unit 140.

The camera unit may be included in the digital signage system 100. The digital signage system 100 can then acquire at least one of image and video through the camera unit. The display unit 160 displays video, graphic, image, etc., which correspond to the signage content received through the communication unit 140. Alternatively, the display unit 160 can display a signage content (for example, video data, graphic data, image data, etc.) previously stored in the storage unit 130. The display unit 160 may be implemented as a touch screen and thus can be used as an input unit in addition to an output unit.

In addition, at least one of the display units of the digital signage system according to an embodiment of the present invention is a transparent display as shown in FIG. 1(*b*). Referring to FIG. 1(*b*), the transparent display unit 10 includes a transparent display 11 and its stand 13. The transparent display 11 displays information while transmitting light, whereby an image beyond the display is seen.

Examples of the transparent display 11 include a Thin Film Electroluminescent Display and an OLED (Organic Light Emitting Diode). The Thin Film Electroluminescent Display and the OLED (Organic Light Emitting Diode can be driven in a passive matrix manner. Since they do not need a TFT, they are manufactured as a transparent light emitting diode and a transparent electrode, whereby the entire display can be transparent. Also, a display, which uses a TFT, like an active matrix OLED, can be made transparently by manufacturing a TFT using a transparent material such as a multi-component oxide semiconductor. Also, the transparent display 11 may be a plasma display panel manufactured of an electrode and a dielectric layer, each of which is made of a transparent material, and a barrier made of a glass composition. In addition to the above examples, the transparent display applied to this embodiment includes all kinds of displays that transmit light while information is being displayed and even while information is not being displayed.

Further, the stand 13 is fixed so the transparent display 11 stands on the floor. The stand 13 may be implemented in various types. For convenience, FIG. 1(*b*) illustrates that the stand 13 is supported when the transparent display 11 stands on the floor. Various hardware components required for driving of the transparent display 11 may be installed in the stand 13. For example, a power unit for supplying a power to the transparent display 11 and a driving board for making signals required to drive the transparent display 11 may be installed in the stand 13.

In another example, a hardware component required for driving of the transparent display 11 may be configured separately to be spaced apart from the transparent display 11. In this instance, the transparent display 11 may be fixed to a glass wall or stands on the floor. In another example, the stand 13 is supported so it stands on the floor, and may include a moving mechanism such as wheel and rail therebelow, whereby the stand 13 can be used during spatial interval adjustment between the display units in accordance with the present invention.

For convenience of description of a corresponding portion in this specification, terms such as broadcast signal, service and application may be used, and each of these terms may be an example of the signage content related to the present invention.

Figure 2:
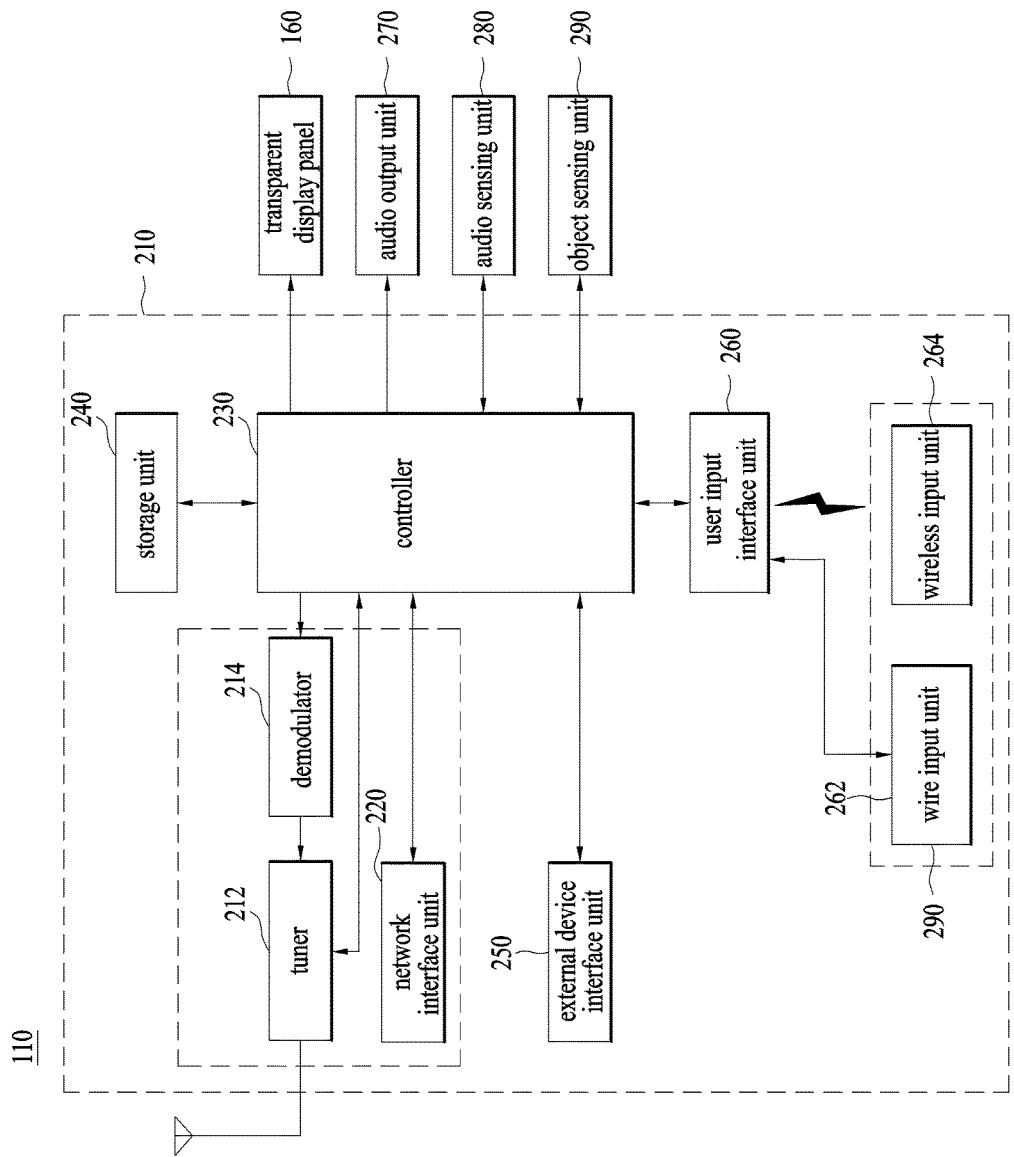
FIG. 2 is a block diagram illustrating a server according to one embodiment of the present invention.
Figure 3:
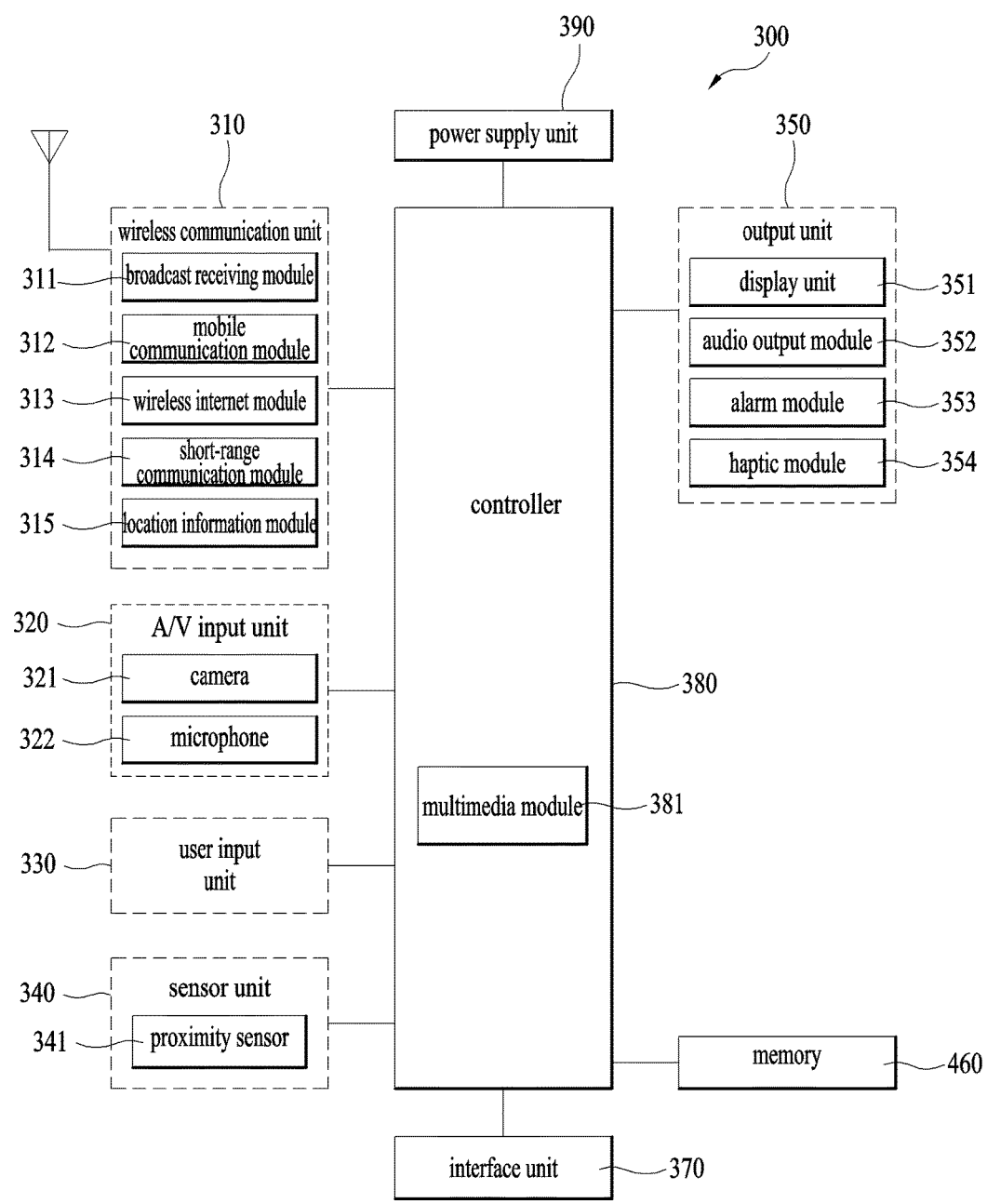
FIG. 3 is a block diagram illustrating a server according to another embodiment of the present invention.

Next, FIG. 2 is a block diagram illustrating a server 110 according to one embodiment of the present invention. In this specification, as a server or system controller (hereinafter, server 110), a digital TV is illustrated in FIG. 2, while a mobile terminal is illustrated in FIG. 3. In addition, the server 110 may be implemented as various processors such as PC, notebook computer, etc. Among a plurality of display devices, a display device for initially displaying a signage content may not be a transparent display. Further, the display device can also be the same component as that of FIG. 2 or 3. In this instance, the server 110 can be replaced with the display device.

The server 110 is an intelligent video display device that additionally provides a computer support function in addition to a broadcast receiving function. As the server 110 is additionally provided with an Internet function while performing a broadcast receiving function, the server 110 may be provided with an interface convenient for use, such as a manual type input device, a touch screen, a spatial remote controller.

The server 110 can be connected to Internet and computer in accordance with the support of wire or wireless Internet function to perform functions such as e-mailing, web browsing, banking, games, etc. A standardized operating system (OS), Web OS, etc. can be used for such various functions.

Therefore, because the server 110 can freely be provided with or delete various applications on a general-purpose OS kernel, the server 110 can perform user-friendly various functions. For example, the server 110 may include a mobile terminal such as a network TV, an HBBTV, a smart TV, and a smart phone.

Referring to FIG. 2, the server 110 may include a display unit 160 for displaying an image, and a driving unit 210 for supplying a driving signal to the display unit 160. If the server 110 receives a broadcast signal, the server can include the driving unit 210 for supplying a driving signal to the display unit 160 in response to the received broadcast signal. Alternatively, even though the server 110 does not receive a broadcast signal, the driving unit 210 can supply a driving signal for image display to the display unit 160.

The driving unit 210 controls image display and audio output of the server 110. The driving unit 210 may include a receiving unit, an external device interface unit 250, a storage unit 240, a user input interface unit 260, a controller 230, and a command input unit. The driving unit 210 and the display unit 160 may be formed in a single body. Alternatively, the driving unit 210 and the display unit 160 may be modularized separately, and can perform communication with each other through a wire or wireless manner.

Also, the server 110 may include a voice or audio output unit 270 for outputting a voice, an audio sensing unit 280 for sensing a voice, and an object sensing unit 290 for sensing a user's motion, position, face, etc., taking an image or photo of a predetermined object, or acquiring information of a predetermined object. The server 110 will now be described in more detail.

The receiving unit may include a tuner 212, a demodulator 214, and a network interface unit 220. In accordance with the system, the receiving unit may be designed so as not to include the network interface unit 220 while including the tuner 212 and the demodulator 214. On the contrary, the receiving unit may be designed so as not to include the tuner 212 and the demodulator 114 while including the network interface unit 220.

The tuner 212 selects a radio frequency (RF) broadcast signal corresponding to a channel selected by a user from among RF broadcast signals received through an antenna or all previously stored channels. Also, the tuner 212 converts the received RF broadcast signal to a digital intermediate frequency (IF) signal or a baseband video or audio signal.

The demodulator 214 can perform demodulation by receiving the digital IF (DIF) signal converted by the tuner 212. The demodulator 214 can perform demodulation and channel decoding and then output a Transport Stream (TS) signal. Further, the TS signal may be a signal in which a video signal, an audio signal and a data signal are multiplexed. The TS signal output from the demodulator 214 may be input to the controller 230.

The controller 230 performs demultiplexing, video/audio signal processing and/or the like and then outputs a video to the display unit 160, and outputs an audio to the audio output unit 270. The external device interface unit 250 can connect an external device with the server 110 according to an embodiment of the present invention. Thus, the external device interface unit 250 may include an A/V input/output unit or a wireless communication unit.

The external device interface unit 250 can be connected with external devices such as a digital versatile disk (DVD), a Blu-ray player, a game device, a camcorder, and a computer (notebook computer) in a wired/wireless manner. The external device interface unit 250 can deliver a video, audio, or data signal input through a connected external device to the controller 230 of the server 110. Also, the external device interface unit 250 can output the video, audio or data signal processed by the controller 230 to the connected external device.

The network interface unit 220 may provide an interface for connecting the server 110 with a wire/wireless network including Internet network. The network interface unit 220 can transmit or receive data to or from other user or other electronic device through a connected network or other network linked with the connected network. The network interface unit 220 can be connected to a predetermined web page through a connected network or other network linked with the connected network. That is, the network interface unit 220 can be connected to a predetermined web page through a network to transmit or receive data to or from a corresponding server. In addition, the network interface unit 220 can receive content or data provided by a content provider or a network manager.

That is, the network interface unit 220 can receive content such as movies, advertisements, games, VOD, or broadcast signals and information associated with the content, which are provided by the content provider or the network provider over a network. The network interface unit 220 can also receive update information and update files of firmware provided by the network manager. The network interface unit 220 can transmit data to the Internet or content provider or the network manager.

The storage unit 240 can store programs for signal processing and control within the controller 230 and store the processed video, audio or data signal. In addition, the storage unit 240 can execute a function of temporarily storing the video, audio or data signal input from the external device interface unit 250 or the network interface unit 220. Also, the storage unit 240 can store information on a predetermined broadcast channel through a channel memory function. The storage unit 220 includes at least one of a flash memory type, a hard disk type, a multimedia card micro type, a card type memory (e.g., SD or XD memory), RAM, EEPROM, etc.

Further, the server 110 can reproduce content files (a video file, a still image file, a music file, a text file, an application file, etc.) stored in the storage unit 240 and provide them to the user. The command input unit may include an input key for allowing a user to input a command. The command input unit may include a wire input unit 262 for inputting a command in a wire manner, and a wireless input unit 264 for inputting a command in a wireless manner.

The command input unit can input various commands such as power on/off, channel selection, screen setup, volume control, cursor movement on the screen, and menu selection. In this instance, the wireless input unit 264 may be a remote controller for remote control. The user input interface unit 260 can deliver the signal input by the user through the command input unit to the controller 230, or can deliver the signal from the controller 230 to the command input unit.

If the user inputs a predetermined command through the wire input unit 262, the input command can directly be delivered to the controller without through the user input interface unit 260. The user input interface unit 260 can receive and process the command input from the wireless input unit 264 or process the control signal from the controller 230 to be transmitted to the wireless input unit 264 in accordance with various communication schemes such as RF communication, IR communication, and the like.

Also, for example, the user input interface unit 260 can transmit control signals input through a power key, a channel key, a volume key, and a local key of the command input unit to the controller 230. The controller 230 can generate and output a signal for video or audio output by demultiplexing streams input through the tuner 212, the demodulator 214 or the external device interface unit 250 or processing the demultiplexed signals.

The video signal processed by the controller 230 may be input to the display unit 160 and displayed as an image corresponding to the corresponding video signal. In addition, the video signal processed by the controller 230 may be input to an external output device through the external device interface unit 250. The audio signal processed by the controller 230 may be output to the audio output unit 270. Also, the audio signal processed by the controller 230 may be output to an external output device through the external device interface unit 250.

Also, the controller 230 controls the overall operation of the server 110. For example, the controller 230 controls the tuner 212 to tune to an RF broadcast corresponding to a channel selected by the user or a previously stored channel. Also, the controller 230 controls the server 110 in accordance with a user command input through the user input interface unit 260 or an internal program. Particularly, the controller 230 controls the server 110 to be linked to a network to download an application or application list that the user desires, to the server 110.

For example, the controller 230 controls the tuner 212 to receive a signal of a channel selected in response to a predetermined channel selection command received through the user input interface unit 260. In addition, the controller 230 processes a video, audio or data signal corresponding to the selected channel. The controller 230 controls information on a channel selected by the user to be output with the processed video or audio signal through the display unit 160 or the audio output unit 270.

In another example, the controller 230 controls a video signal or an audio signal received from an external device, for example, a camcorder through the external device interface unit 250 to be output through the display unit 160 or the audio output unit 270 in accordance with an external device image reproduction command received through the user input interface unit 260.

The controller 230 controls the display unit 160 to display images. For example, the controller 230 controls a broadcast image input through the tuner 212, an external input image input through the external device interface unit 250, an image input through the network interface unit 220, or an image stored in the storage unit 240 to be displayed on the display unit 160. Further, the image displayed on the display unit 160 may be a still image or video, and may be a 2D or 3D image.

The controller 230 controls reproduction of content. Further, the content may be content stored in the server 110, received broadcast content, or content input from an external device. The content may include at least one of a broadcast image, an external input image, an audio file, a still image, an image of a linked web, and a text file. Also, the controller 230 searches for user terminals connected with the transparent display unit through the network interface unit 220, outputs a list of the searched user terminals through the display unit 160, and receives a selection signal of the user terminal used as a user controller among the list of the searched user terminals through the user input interface unit 260.

Also, the controller 230 controls the display unit 160 to output player information corresponding to each user terminal. The display unit 160 converts the video signal, the data signal, or OSD signal processed by the controller 230 or the video signal and the data signal received from the external device interface unit 250 into RGB signals to generate driving signals. The display unit 160 may be arranged on a touch screen.

The audio output unit 270 receives a signal audio-processed by the controller 230, for example, a stereo signal, a 3.1 channel signal or a 5.1 channel signal, and outputs the received signal as audio. The audio output unit 270 may be configured as one of various types of speakers.

The audio sensing unit 280 may sense audio generated inside or outside the server 110. The audio sensing unit 280 may include an audio sensor or a microphone. The object sensing unit 290 can sense a user's motion, position, face, etc. Thus, the object sensing unit 290 may include a sensor unit that includes at least one of a touch sensor, an audio sensor, a position sensor, and an action sensor. The signal sensed by the sensor unit can be delivered to the controller 230.

Also, the object sensing unit 290 may include a photographing unit such as a camera. Image information photographed by the photographing unit may be input to the controller 230. Alternatively, the object sensing unit 290 may include a sensor unit and a photographing unit together.

The controller 230 can acquire information on a user's gesture, face, and position from an image captured by the photographing unit or a signal sensed by the sensing unit, or by combining the image and the signal. Also, the object sensing unit 290 can sense information on a user's face type and a user's face direction as well as a user's motion.

Next, FIG. 3 is a block diagram illustrating a server according to another embodiment of the present invention. Referring to FIG. 3, the server 110 includes a wireless communication unit 310, an A/V (Audio/Video) input unit 320, a user input 330, a sensing unit 340, an output unit 350, a memory 360, an interface unit 370, a controller 380, and a power supply unit 390.

The wireless communication unit 110 may include one or more modules which permit communications such as wireless communications between the mobile terminal 100 and a wireless communication system, communications between the mobile terminal 100 and another mobile terminal, or communications between the mobile terminal 100 and an external server. For example, the wireless communication unit 310 may include at least one of a broadcast receiving module 311, a mobile communication module 312, a wireless Internet module 313, a short-range communication module 314, and a location information module 315.

The broadcast receiving module 311 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 311 may be utilized to facilitate simultaneously receiving of two or more broadcast channels, or to support switching among broadcast channels. The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 311 can receive the digital broadcast signals using a method appropriate for the transmission method utilized. Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112. The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 311 may be stored in a suitable device, such as a memory 360.

The mobile communication module 312 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 312 include audio call signals, video (telephony) call signals, or various formats of data to support communication of text and multimedia messages.

The wireless Internet module 313 is configured to facilitate wireless Internet access. This module may be internally or externally coupled to the server 110. The wireless Internet module 113 can transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 313 can transmit/receive data according to one or more of such wireless Internet technologies, and other Internet technologies as well.

The short-range communication module 314 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 315 is generally configured to detect, calculate, derive or otherwise identify a position of the server 110. As an example, the location information module 315 includes a Global Position System (GPS) module, a Wi-Fi module, or both.

The A/V input unit 320 is configured to permit various types of input to the mobile terminal 120. Examples of such input include audio, image, video, data, and user input. Image and video input is often obtained using one or more cameras 321. Such cameras 321 may process image frames of still pictures or video obtained by image sensors in a video or image capture mode. The processed image frames can be displayed on the display unit 351 or stored in memory 360.

The processed image frames in the camera 321 can be stored in the memory 360, and can be transmitted to external device via the wireless communication unit 310. According to the user environment, at least two cameras 321 can be arranged in the server 110.

The microphone 322 is generally implemented to permit audio input to the mobile terminal 100. The audio input can be processed in various manners according to a function being executed in the mobile terminal 100. If desired, the microphone 322 may include assorted noise removing algorithms to remove unwanted noise generated in the course of receiving the external audio.

The user input unit 330 is a component that permits input by a user. Such user input enables the controller 380 to control operation of the mobile terminal 100. The user input unit 330 may include one or more of a mechanical input element (for example, a key, a button located on a front and/or rear surface or a side surface of the mobile terminal 100, a dome switch, a jog wheel, a jog switch, and the like), or a touch-sensitive input, among others.

The sensing unit 340 is generally configured to sense one or more of internal information of the mobile terminal, surrounding environment information of the mobile terminal, user information, or the like. The controller 180 generally cooperates with the sending unit 340 to control operation of the server 110 or execute data processing, a function or an operation associated with an application program installed in the server 110 based on the sensing provided by the sensing unit 340. The sensing unit 340 may be implemented using any of a variety of sensors, some of which will now be described in more detail.

The output unit 350 is typically configured to output various types of information, such as audio, video, tactile output, and the like. The output unit 350 is shown having a display unit 351, an audio output module 352, an alarm unit 353, and a haptic module 354. The display unit 351 is generally configured to output information processed in the server 110. For example, the display unit 351 may display execution screen information of an application program executing at the server 110 or user interface (UI) and graphic user interface (GUI) information in response to the execution screen information.

The display unit 351 outputs information processed in the mobile terminal 100. The display unit 351 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Some display includes transparent type or light penetration type and can be called transparent display. For example, a typical transparent display is TOLED (Transparent OLED). The back structure of the display unit 351 can be also composed of light penetration structure. According to the structure, the user can see the things that are located in the back side of the terminal body through the area occupied by the display unit 351 of the terminal body.

The display unit 351 can be implemented using two display devices, which can implement the same or different display technology. For instance, a plurality of the display units 351 can be arranged on one side, either spaced apart from each other, or these devices may be integrated, or these devices may be arranged on different surfaces.

A touch sensor can sense a touch applied to the touch screen, such as display unit 351, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 351, or convert capacitance occurring at a specific part of the display unit 351, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 380. Accordingly, the controller 380 may sense which region of the display unit 351 has been touched. Here, the touch controller may be a component separate from the controller 380, the controller 380, and combinations thereof.

The proximity sensor 341 may include a sensor to sense presence or absence of an object approaching a surface, or an object located near a surface, by using an electromagnetic field, infrared rays, or the like without a mechanical contact. The proximity sensor 341 may be arranged at an inner region of the mobile terminal covered by the touch screen, or near the touch screen.

The proximity sensor 341, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 341 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 341 may sense proximity touch, and proximity touch patterns (for example, distance, direction, speed, time, position, moving status, and the like).

In general, controller 380 processes data corresponding to proximity touches and proximity touch patterns sensed by the proximity sensor 341, and cause output of visual information on the touch screen. In addition, the controller 380 can control the mobile terminal 100 to execute different operations or process different data according to whether a touch with respect to a point on the touch screen is either a proximity touch or a contact touch.

The audio output module 352 is generally configured to output audio data. Such audio data may be obtained from any of a number of different sources, such that the audio data may be received from the wireless communication unit 310 or may have been stored in the memory 360. The audio data may be output during modes such as a signal reception mode, a call mode, a record mode, a voice recognition mode, a broadcast reception mode, and the like. The audio output module 352 can provide audible output related to a particular function (e.g., a call signal reception sound, a message reception sound, etc.) performed by the server 110. The audio output module 352 may also be implemented as a receiver, a speaker, a buzzer, or the like.

The alarm unit 353 can output the signal to notify the event occurrence of the server 110. For example, the event that occurs in the mobile terminal are receiving call signal, receiving a message, key signal input, touch input. The alarm unit 353 can output the signal to notify the occurrence of the event by other types besides video signal, audio signal. For example, the alarm unit 353 can output the signal to notify the occurrence of the event by the vibration. The display unit 351 and the audio output module 352 can be classified as a part of the alarm unit 353 since the video signal and audio signal can be output via the display unit 351 and audio output module 352.

A haptic module 354 can be configured to generate various tactile effects that a user feels, perceive, or otherwise experience. A typical example of a tactile effect generated by the haptic module 354 is vibration. The strength, pattern and the like of the vibration generated by the haptic module 354 can be controlled by user selection or setting by the controller. For example, the haptic module 354 can output different vibrations in a combining manner or a sequential manner. Besides vibration, the haptic module 354 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 354 can also be implemented to allow the user to feel a tactile effect through a muscle sensation such as the user's fingers or arm, as well as transferring the tactile effect through direct contact. Two or more haptic modules 354 may be provided according to the particular configuration of the server 110.

The memory 360 can store programs to support operations of the controller 380 and store input/output data (for example, phonebook, messages, still images, videos, etc.). The memory 360 may store data related to various patterns of vibrations and audio which are output in response to touch inputs on the touch screen.

The memory 360 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The server 110 may also be operated in relation to a network storage device that performs the storage function of the memory 360 over a network, such as the Internet.

The interface unit 370 serves as an interface for external devices to be connected with the server 110. For example, the interface unit 370 can receive data transmitted from an external device, receive power to transfer to elements and components within the server 110, or transmit internal data of the server 110 to such external device. The interface unit 370 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the server 110 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the server 110 via the port.

When the server 110 is connected with an external cradle, the interface unit 370 can serve as a passage to allow power from the cradle to be supplied to the server 110 or may serve as a passage to allow various command signals input by the user from the cradle to be transferred to the mobile terminal there through. Various command signals or power input from the cradle may operate as signals for recognizing that the server 110 is properly mounted on the cradle.

The controller can control overall operation of the server 110. The controller 380 can also perform the controlling and processing associated with voice calls, data communications, video calls, and the like, or perform pattern recognition processing to recognize a handwriting input or a picture drawing input performed on the touch screen as characters or images, respectively. In addition, the controller 380 can control one or a combination of those components in order to implement various exemplary embodiments disclosed herein. The multimedia module 381 can be implemented in the controller 380, and also it can be implemented independently with the controller 380. The controller 380 can perform pattern recognition processing that is available to recognize writing input, drawing input on the touch screen as a text, and image respectively.

The power supply unit 390 can receive external power or provide internal power and supply the appropriate power required for operating respective elements and components included in the server 110. The power supply unit 390 may include a battery, which is typically rechargeable or be detachably coupled to the terminal body for charging. Various embodiments described herein may be implemented in a computer-readable medium, a machine-readable medium, or similar medium using, for example, software, hardware, or any combination thereof.

According to the embodiment of hardware, the embodiments of present invention is can be implemented based on at least one of ASICs, DSPs, DSPDs, PLDs, FPGAs, processer, controller, micro-controller, micro processer, electronic unit for performing other functions. Some embodiments of present invention described in the specification can be implemented by the controller 380 itself.

According to the embodiment of software, embodiments such as process, function described in the specification can be implemented as separate software modules. Each software module can perform at least one function and operation described in the specification. And the software code can be implemented as software application written by proper programming language. Herein, the software code can be stored in the memory 360, and can be executed by the controller 380.

Figure 4:
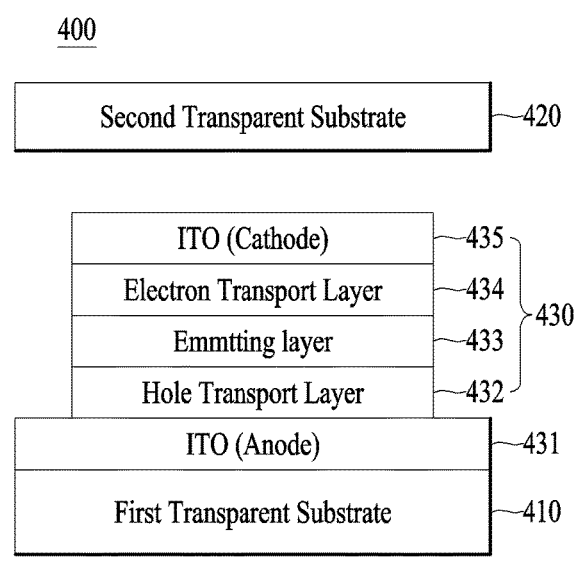
FIG. 4 is a cross-sectional view illustrating a display device according to one embodiment of the present invention.

Next, FIG. 4 is a cross-sectional view illustrating a display device according to one embodiment of the present invention. Referring to FIG. 4, a transparent display panel 400 includes a first transparent substrate 410, a second transparent substrate 420, and an image layer 430 arranged between the first transparent substrate 410 and the second transparent substrate 420. In this instance, the image layer 430 arranged between the first transparent substrate 410 and the second transparent substrate 420 may be referred to as an organic cell.

The first transparent substrate 410 and the second transparent substrate 420 have light transmission characteristics. The image layer 430 includes an anode 431, a hole transport layer 432, an emitting layer 433, an electron transport layer 434, and a cathode 435. In this instance, if a voltage is applied to the cathode 435 and the anode 431, a contrast current is supplied, whereby electrons generated from the cathode 435 move to the emitting layer 433 through the electron transport layer 434.

Also, holes generated from the anode 431 move to the emitting layer 433 through the hole transport layer 432. Further, the electrons supplied from the electron transport layer 434 collide with the holes supplied from the hole transport layer 432 in the emitting layer 433, whereby recombination of the electrons and the holes occurs. Light is generated from the emitting layer 433 by collision of the electrons and the holes. Luminance of light generated from the emitting layer 433 may be proportional to a size of the contrast current supplied to the anode 431.

In this structure, if light is generated from the emitting layer 433, light may be emitted toward the first transparent substrate 410 or the second transparent substrate 420. Therefore, a user can view a video through the first transparent substrate 410 or the second transparent substrate 420. FIG. 4 illustrates an example of the transparent display panel 400, and the present invention is not limited to FIG. 4.

Figure 5:
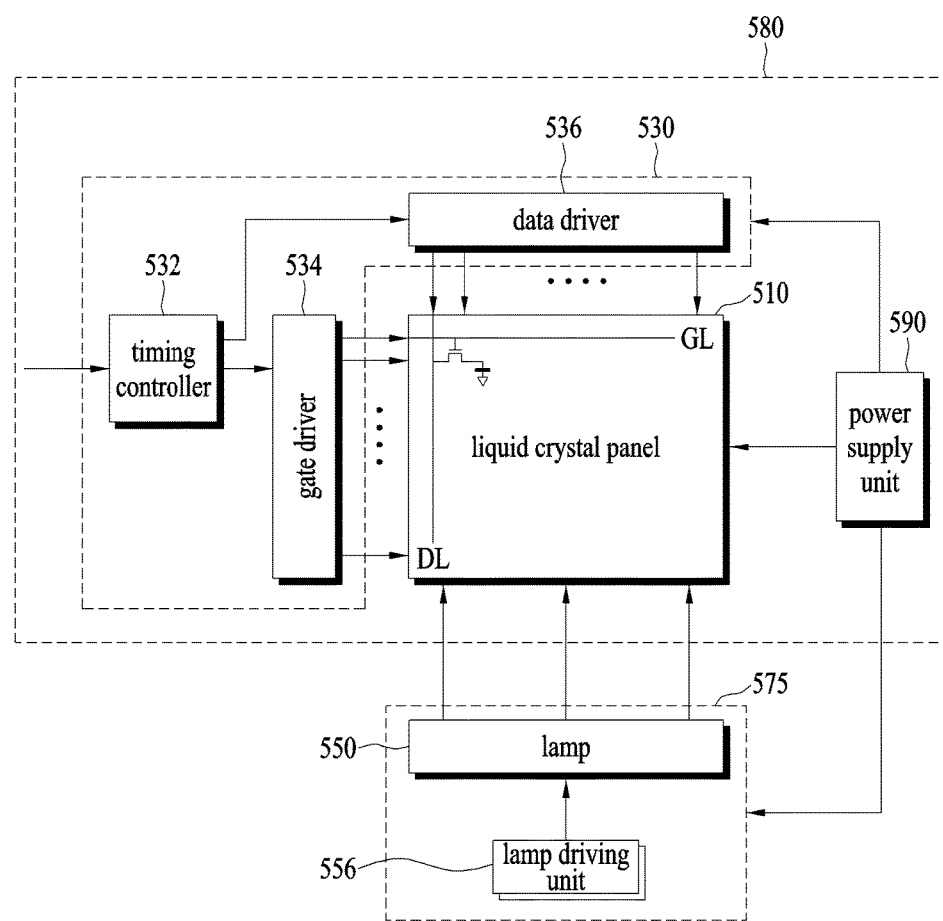
FIG. 5 is an internal circuit diagram illustrating a display device according to one embodiment of the present invention.

Next, FIG. 5 is an internal circuit diagram illustrating a display device 500 according to one embodiment of the present invention. Referring to FIG. 5, the display device 500 includes a display panel 510 and a driving circuit unit 530. In addition, a related art backlight unit is combined with the display panel 510 of the display device 500 and supplies generated light to the display panel 510.

However, according to the embodiment of the present invention, the backlight unit, that is, a light source unit 575 is arranged to be spaced apart from the display panel 510. The display panel 510 spaced apart from the light source unit 575 is a transparent display panel, and displays a corresponding image if the image is input, wherein the image is displayed transparently to allow a product or space behind the display panel 510 to be seen.

The display panel 510 includes a first substrate on which a plurality of gate lines GL are arranged to cross a plurality of data lines DL in a matrix arrangement to display an image and a thin film transistor and a pixel electrode connected with the thin film transistor are formed in the crossed area, a second substrate provided with a common electrode, and a liquid crystal layer formed between the first substrate and the second substrate. Meanwhile, color filters for displaying colors may further be arranged on the second substrate.

The driving circuit unit 530 drives the display panel 510 through the control signal and the data signal supplied from the controller. Thus, the driving circuit unit 530 may include a timing controller 532, a gate driver 534, and a data driver 536.

The timing controller 532 controls the gate driver 534 and the data driver 536 in response to the control signal by receiving the control signal, R, G and B data signals and a vertical synchronization signal Vsync from the controller, and rearranges the R, G and B data signals and then provides the rearranged R, G and B data signals to the data driver 536.

Also, scan signals and video signals are supplied to the display panel 510 through the gate lines GL and the data lines DL under the control of the gate driver 534, the data driver 536 and the timing controller 532. Although the timing controller 532, the gate driver 534 and the data driver 536 are provided in the driving circuit unit 530 in FIG. 5, modifications can be made in the elements of FIG. 5.

The light source unit 575 supplies light and include lamps 550 which are light sources, and a lamp driving unit 556 for turning on/off the lamps 550. If the plurality of lamps 550 are turned on, light emitted from the lamp 550 is irradiated to the product. The display panel 510 can display a video based on an input video signal by using the irradiated light.

The plurality of lamps 550 may include light emitting diodes (LEDs). In addition, the power supply unit 590 can supply a common electrode voltage Vcom to the display panel 210 and supply a gamma voltage to the data driver 536. Also, the power supply unit 590 can supply a driving power source for driving the lamp 550 to the light source unit 575.

Figure 6:
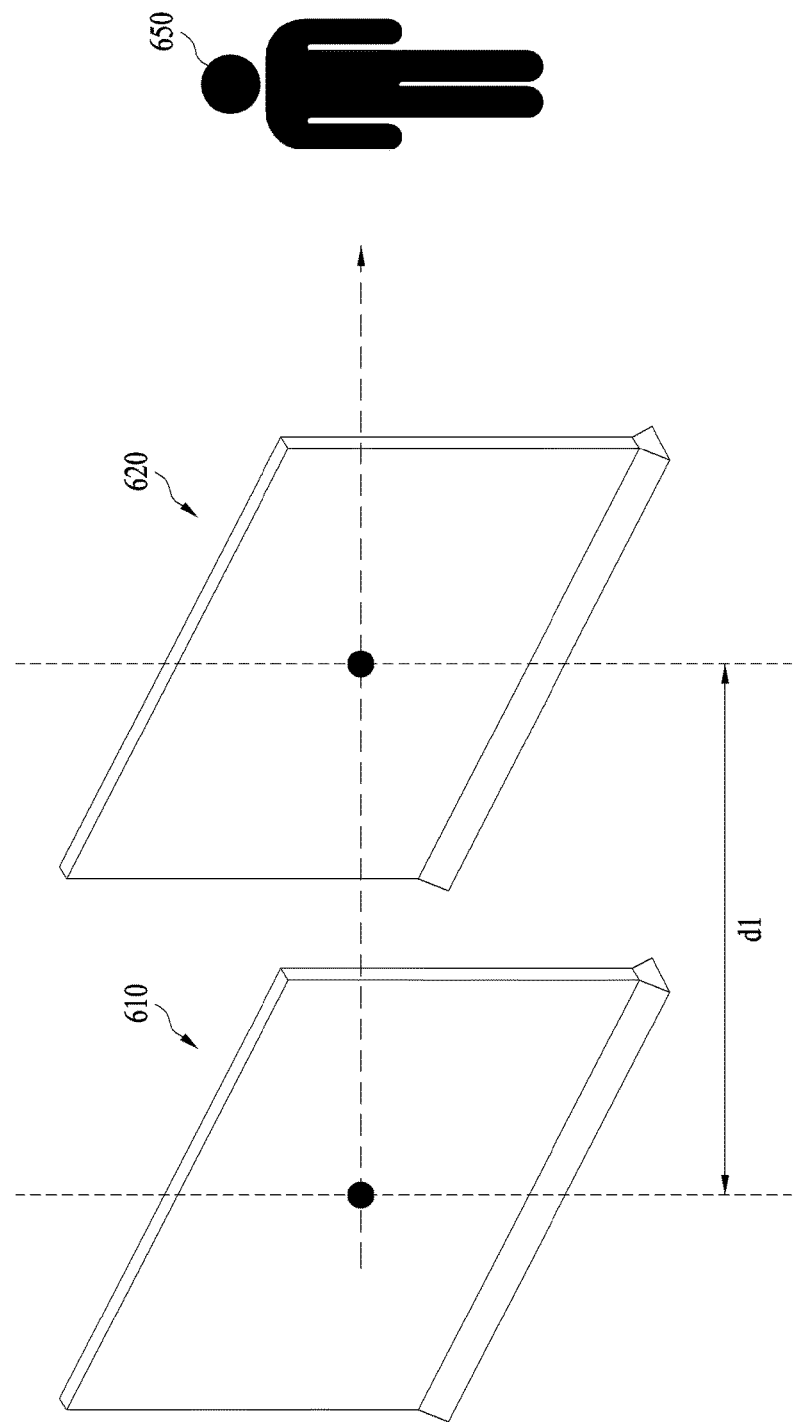
FIGS. 6 and 7 are schematic diagrams illustrating a digital signage system according to one embodiment of the present invention.
Figure 7:
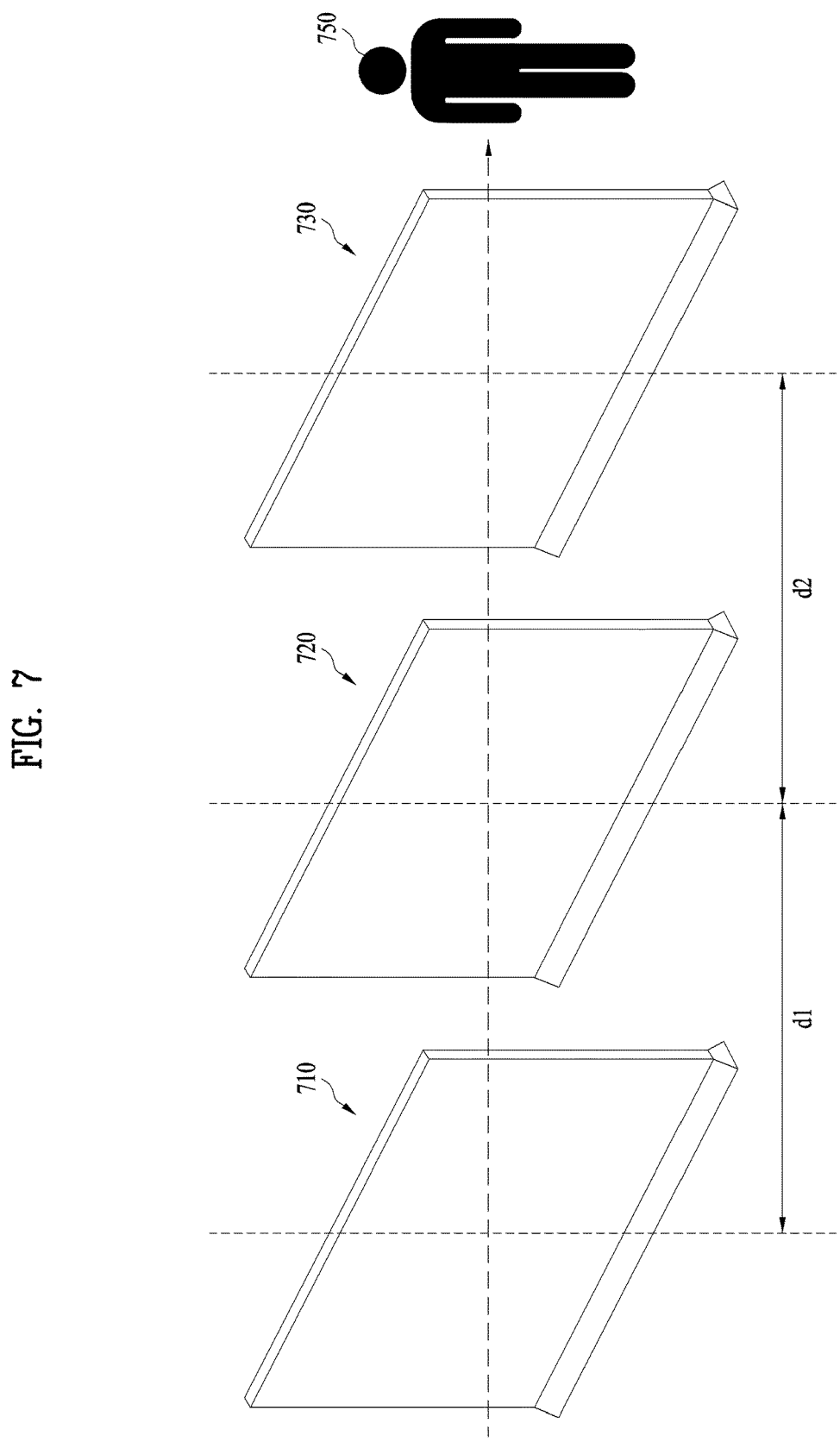

Next, FIGS. 6 and 7 are schematic diagrams illustrating a digital signage system according to one embodiment of the present invention, and FIG. 8 is a view illustrating a function of a controller of a digital signage system according to one embodiment of the present invention. Hereinafter, a server is included in the digital signage system even though the server is not shown for convenience of description.

FIG. 6 illustrates a digital signage system that includes two display devices, and FIG. 7 illustrates a digital signage system that includes three display devices. First of all, referring to FIG. 6, a first display device 610 and a second display device 620 are arranged at the front of a reference 650 such as a user or a predetermined point. The first display device 610 and the second display device 620 are arranged at a predetermined distance, that is, spatial interval d1. In this instance, it is preferable that the spatial interval d1 is a predetermined threshold spatial interval or less.

The display devices 610 and 620 are aligned, but not limited to, in series from the reference 650 as an embodiment. Therefore, although the display devices 610 and 620 are arranged at the front of the reference 650, it is preferable that a straight line shape is drawn when a parallel line from the reference 650 to the display devices 610 and 620 is assumed. It is noted from the straight line shape that at least a partially overlapped screen area of display screens of the respective display devices exists based on the reference 650.

Both the first display device 610 and the second display device 620 can be transparent display devices or any one of them can be a transparent display device. For the latter case, for example, the display device on which one image is displayed based on the reference in FIG. 6, that is, the first display device 610 may be at least one of a digital TV, a monitor, and a mirror not the transparent display device, while the second display device 620 may be the transparent display device.

Next, referring to FIG. 7, a total of three display devices, a first display device 710, a second display device 720 and a third display device 730 are arranged at the front of the reference 650 unlike FIG. 6. The first display device 710 and the second display device 720 are arranged at a first spatial interval d1, and the second display device 720 and the third display device 730 are arranged at a second spatial interval d2. Preferably, each of the first spatial interval d1 and the second spatial interval d2 is a predetermined threshold spatial interval or less. Also, the first spatial interval d1 and the second spatial interval d2 may have the same spatial interval, that is, constant interval or not. The display devices 710, 720 and 730 are aligned, but not limited to, in series from the reference 650 as an embodiment.

In FIG. 7, at least one of the first to third display devices 710 to 730 may be a transparent display device. For example, the display device on which one image is displayed based on the reference in FIG. 7, that is, the first display device 710 may be at least one of a digital TV, a monitor, and a mirror not the transparent display device, while the second display device 720 and the third display device 730 may be the transparent display devices.

In the above description, the server or the controller of the server (for convenience, hereinafter, referred to as 'controller') can randomly adjust or control the spatial interval between the display devices.

Next, FIG. 8 relates to a method for managing and controlling a digital signage system at a server terminal. FIG. 8(*a*) illustrates that three display devices 810, 820 and 830 are vertically arranged, and FIG. 8(*b*) illustrates UI/UX that includes data related to the display devices 810, 820 and 830 of the controller of the server terminal.

The controller of the server terminal can identify information on the display devices 810, 820 and 830 arranged vertically as shown in FIG. 8(*a*) through the UI/UX of FIG. 8(*b*). Referring to the UI/UX of FIG. 8(*b*), the controller can identify the arrangement shape, relative position, spatial distances (d, d1, d2, etc.), arrangement angle, etc. of the display devices based on a predetermined random reference. Further, the UI/UX can be provided in the form of a navigation map to assist identification convenience of a user.

The UI/UX can be provided through software, firmware, etc. In addition, the controller may include information on a signage content for the display devices 810, 820 and 830 in the UI/UX. In this instance, the information on the signage content may include various kinds of information such as attribute and type of the signage content and display on/off time of each display device.

As described above, the UI/UX of FIG. 8(*b*) is intended for management and control of the display devices 810, 820 and 830 of FIG. 8(*a*), and may be provided together with various functional keys, input keys, etc. for the management and control. Also, the controller can acquire information on the display devices through the UI/UX of FIG. 8(*b*) in real time, as described later. For example, even when an event such as removal, position change, angle change, and failure occurs in at least one of the display devices or a new display device is additionally provided, this event or addition of the new display device can be identified through the UI/UX and then managed and controlled. This will be described later in detail.

Figure 9:
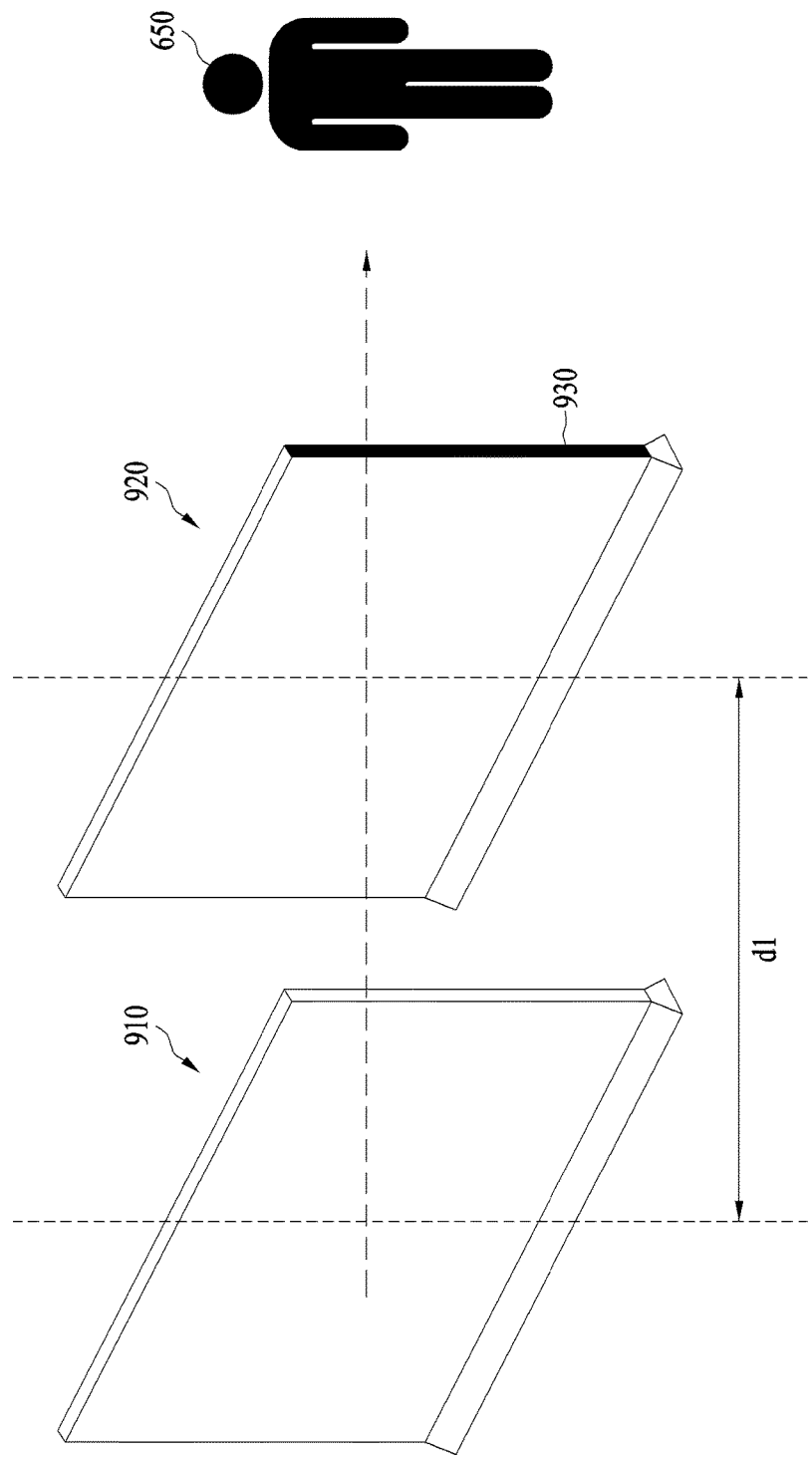
FIG. 9 is a view illustrating a digital signage system according to another embodiment of the present invention.

FIG. 9 is a view illustrating a digital signage system according to another embodiment of the present invention. Unlike the digital signage system of FIG. 6, although two display devices 910 and 920 are arranged in series at a predetermined spatial interval d1 based on the reference 650 in FIG. 9, the first display device 910 and the second display device 920 are different from each other in their sizes.

For example, FIG. 9 illustrates the size of the second display device 920 is relatively greater than that of the first display device 910. In addition, the sizes of the display devices may be contrary to FIG. 9. This is equally applied to when display device(s) is(are) additionally provided. In other words, it is not required that two or more display devices constituting the digital signage system should have the same size.

Referring to FIG. 9, a lamp unit 930 may be attached to all or at least one of the display devices which belong to the digital signage system. An example of the lamp unit may include LED (light emitting device). In FIG. 9, it is noted that the lamp unit 930 is attached to one side of the second display device 920. This is only exemplary, and the lamp unit may be attached to another side or an object for holding the display device.

Although the lamp unit 930 can be directly attached to the corresponding display device, the lamp unit 930 can also be attached to the periphery of the display device. Also, the lamp unit 930 can be detachably attached to the display device. The lamp unit 930 will be described in more detail with reference to FIGS. 10 to 12.

In particular, FIGS. 10 to 12 are views illustrating an image display time interval in a display device according to the embodiment of the present invention. In FIGS. 10 to 12, for convenience of description, three display devices are vertically arranged in series from a reference. Hereinafter, in addition to the spatial interval in the digital signage system, time interval, that is, image display in the display devices will be described.

The controller of the server terminal may control one image to be displayed at a predefined time interval regardless of the spatial interval of the display devices constituting the digital signage system. However, in this specification, the controller of the server terminal determines a time interval considering the spatial interval of the display devices constituting the digital signage system to display one image.

Although the controller of the server terminal applies a predefined spatial interval and time interval to the display devices constituting the digital signage system, if the spatial interval and time interval are different from the defined intervals, the controller of the server terminal can randomly adjust and control the spatial interval or/and the time interval. Also, if there is a change in at least one of the spatial interval and time interval initially set by a predetermined event, the controller of the server terminal can control the interval correspondingly.

In this instance, the predefined time interval is preferably, but not limited to, 40 ms or less to allow the user to feel apparent movement of an image displayed through the display devices. The time interval may also be varied depending on attribute or type of the image. If the spatial interval is defined, in accordance with one embodiment of the present invention, the controller of the server terminal controls the time interval of each display device.

In this instance, the time interval may mean from the display on-timing of image on one display device to the display off-timing of image on the next display device on which image will be displayed. Alternatively, the time interval may mean from the display on-timing of image on one display device to the display on-timing of image on the next display device on which image will be displayed. This time interval is randomly defined for convenience of description in this specification without limitation to the above meanings and may be referred to as various names such as display on/off-timing.

The controller of the server terminal determines a predetermined unit constituting the digital signage system, for example, a spatial interval of display devices which belong to a group. The controller of the server terminal can perform a control operation as follows in accordance with the determined result.

As a result of the determination of the spatial interval, if the spatial interval of the display devices is a first interval or a constant interval, the controller of the server terminal can control a single image display time interval of the display devices to be the same time interval, that is, the constant time. In this instance, the first interval means an allowable interval to permit the single image display time interval as the same or constant time even though the first interval is not the constant interval. For example, the first interval may mean an interval within a predetermined threshold value from the constant interval even though it is not the constant interval.

As a result of the determination of the spatial interval, if the spatial interval of the display devices is not the first interval or the constant interval, the controller of the server terminal controls a single image display time interval of the display devices so as not to be the same time interval. This means that the controller of the server terminal determines the time interval in comparison with the spatial interval of the display devices.

For example, it is assumed that the spatial interval between the first display device and the second display device is d1, the spatial interval between the second display device and the third display device is d2, and the spatial interval is not the first interval or the constant interval when the d1 and the d2 are compared with each other. In this instance, the controller of the server terminal sets a time interval ti1 of a single image display time between the first display device and the second display device differently from a time interval ti2 of a single image display time between the second display device and the third display device. For example, as a result of the comparison of the spatial intervals between the respective display devices, if d1>d2 is obtained, the controller of the server terminal can set the time interval between the display devices as ti1<ti2. However, it is preferable that each of the ti1 and the ti2 is the threshold value or less and the exact time interval is determined in comparison with the spatial interval in accordance with the predetermined rule.

As a result of the determination of the spatial interval, even though the spatial interval of the display devices is not the first interval or the constant interval, the controller of the server terminal can control the single image display time interval of the display devices to be the same time interval. In this instance, the controller of the server terminal can set the time interval to a predetermined threshold value.

The controller of the server terminal can randomly continue to change and set a predetermined event or the spatial interval and the time interval of the display devices even though the spatial interval and the time interval of the display devices are previously set. In this instance, the event may be defined variously, may correspond to when a predetermined display device is out of order, or the time interval or the spatial interval can be controlled for a corresponding image only or wholly to maximize digital signage effect in view of characteristics of the signage content.

Referring to FIG. 10, the controller of the server terminal previously sets the time intervals ti1 and ti2 in accordance with the spatial intervals d1 and d2 of the display devices constituting the digital signage system. Therefore, the controller of the server terminal controls the initial image to be displayed on the first display device as shown in FIG. 10(*a*). If the image is displayed on the first display device as shown in FIG. 10(*a*), the controller of the server terminal controls the second display device to display the image as shown in FIG. 10(*b*) with reference to the set time interval ti1.

If the image is displayed on the second display device as shown in FIG. 10(*b*), the controller of the server terminal the controls the third display device to display the image as shown in FIG. 10(*c*) with reference to the set time interval ti2. As described above, as the controller of the server terminal controls the image display timing of each of the display devices sequentially arranged, if the reference views the digital signage system, especially the third display device, the user can feel apparent movement of the image in accordance with the passage of time as shown in FIG. 17(a). This is equally applied to a reverse case of FIG. 17(a) as shown in FIG. 17(b). In this instance, the time interval of FIG. 17(a) and the time interval of FIG. 17(b) can be the same as each other or not.

Referring to FIGS. 10(a) to 10(c), the single image is displayed on the display devices constituting the digital signage system at the same position and the same size during sequential display. By contrast, in FIGS. 11(a) to 11(c), it is noted that the size of the single image is gradually varied in accordance with the display order to emphasize apparent movement of the displayed image even though the single image is displayed on the same position. For example, in FIGS. 11(a) to 11(c), the same image is displayed but a size of an object within the image in FIG. 11(a) is primarily enlarged in FIG. 11(b) and then secondarily enlarged in FIG. 11(c), whereby it is noted that the size of the object within the image in FIG. 11(c) is enlarged in comparison with FIG. 11(a). As a result, the user can feel apparent movement, for example, approach of the object of the image with the size increase when viewing the image. This is equally applied to the reverse order of FIGS. 11(a) to 11(c).

Also, unlike FIG. 10, in FIGS. 12(a) to 12c as the display position of the object within the image is changed, the size of the object within the image is changed like FIG. 11. In this instance, the user can feel dynamic movement of the object within the image as compared with FIGS. 10 and 11. For example, the object within the image is displayed on the first position of the first display device at the first size in FIG. 12(a), the object within the image is displayed on the second position of the second display device at the second size in FIG. 12(b), and the object within the image is displayed on the third position of the third display device at the third size in FIG. 12(c).

Meanwhile, referring to FIGS. 10 to 12, the controller of the server terminal can control the brightness of each display device. Further, the controller can use the lamp unit described in FIG. 9 to control the brightness of each display device. The controller can control the brightness of the display device, on which the single image is displayed currently, differently from the brightness of the other display device(s) on which the single image is not displayed currently. For example, the controller of the server terminal can control the brightness of the display device, on which the single image is displayed currently, to be brighter than the brightness of the other display device(s) on which the single image is not displayed currently. In FIG. 9, the lamp unit may be provided only when the corresponding display device is a transparent display. In this instance, the lamp unit can control the brightness under the control of the controller of the server terminal considering peripheral illuminance to allow the corresponding display device, which is a transparent display, to be more transparent.

For example, if the lamp unit controls the brightness of the corresponding display device to be brighter than the peripheral illuminance, the transparency of the corresponding display device can be improved. In this way, supposing that the lamp unit is attached to all display devices constituting the digital signage system, the controller can set all the display devices to a specific brightness level or off-state, and then allow the corresponding display device to be brighter or darker than the other display devices at the image display on/off timing, whereby the effect of apparent movement can be improved.

When the digital signage system is a default state, the controller controls the brightness of each display device to be set differently from each other, and controls the brightness of each display device to allow the display device, which is arranged to be the farthest away from the reference, to be the darkest.

Next, FIGS. 13 to 16 are views illustrating a method for controlling a display device according to events of a digital signage system in accordance with one embodiment of the present invention. In particular, FIGS. 13 to 15 relate to correspondence according to an event of the digital signage system. State information of the digital signage system according to the event can be sensed by and reported to the controller of the server in the form of UI/UX of FIG. 8 or 16.

Figure 13:
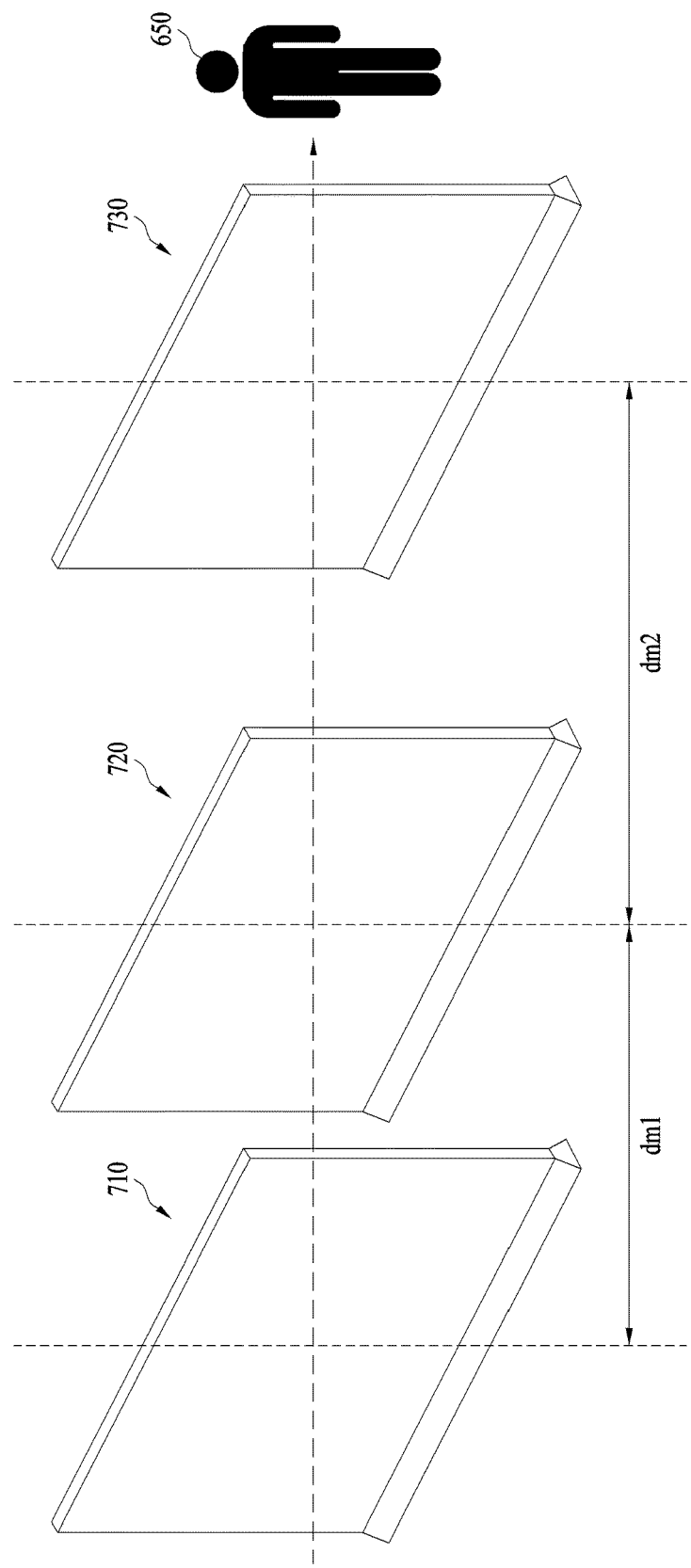

In FIG. 13, it is noted that a spatial interval dm2 between the second display device 720 and the third display device 730 is varied in comparison with the spatial interval d2 of FIG. 2. Although the controller of the server terminal can change the spatial interval from d2 to dm2, if the spatial interval is changed, the controller controls the digital signage system in accordance with the change of the spatial interval. For example, the controller can adjust and control the time interval for the display devices constituting the digital signage system. Further, the controller may not or may change and control the time interval for the display devices of which spatial interval is not changed.

Generally, the controller changes and controls the time interval (t2→t2') between the display devices of which spatial interval is changed. However, if the time interval is also changed and controlled in accordance with the change of the spatial interval, since it affects the time interval between the other display devices constituting the digital signage system, the controller determines whether to change and control the image display time interval between the other display devices of which spatial interval is not changed, considering the effect of apparent movement. For example, if the change of the spatial interval and the change of the time interval based on the change of the spatial interval are determined at a value less than a predetermined threshold value, the controller may not control the change of the spatial interval or the time interval between the other display devices even though the spatial interval and the time interval are changed.

Figure 14:
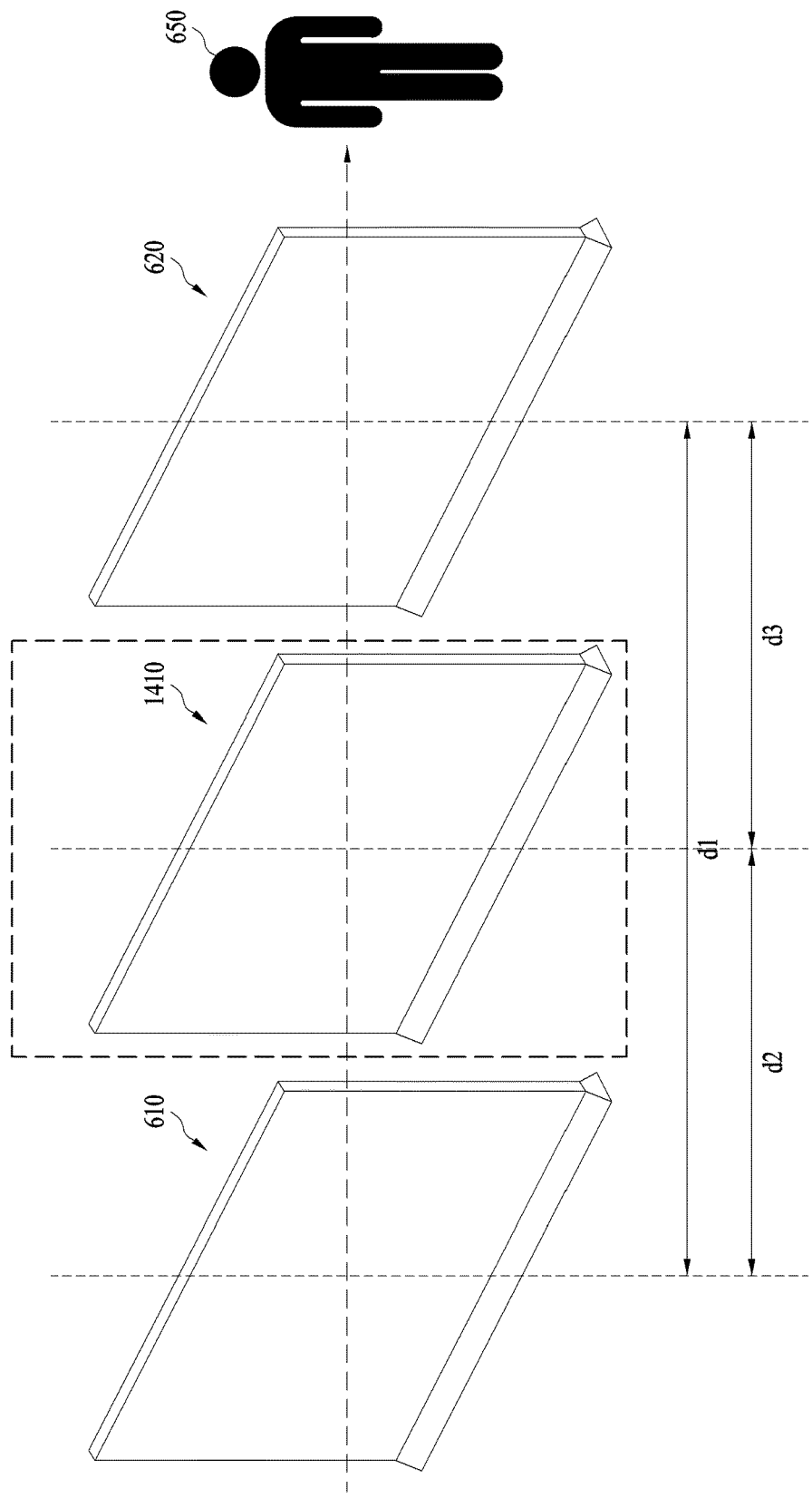

In FIG. 14, a new display device 1410 is additionally provided between the first display device 610 and the second display device 620 of FIG. 6. Unlike FIG. 13, the entire arrangement of the digital signage system is changed in FIG. 14. A new display device can be inserted between the display devices constituting the legacy digital signage system as shown in FIG. 14 or can be added outside both the display devices, or at least one of the display devices constituting the digital signage system can be removed.

In this instance, the controller can determine whether to newly collect information on the display devices of the digital signage system. For example, if the new display device is additionally provided, a spatial interval and a time interval between the added display device and its adjacent display device can be identified. However, for the above insertion or removal, it is preferable to newly identify information on the entire configuration of the digital signage system. For example, if the new display device is inserted as shown in FIG. 14, the controller resets information on the display devices constituting the legacy digital signage system and newly collects corresponding information. The controller controls the digital signage system by newly setting the information such as the spatial interval and the time interval based on the information changed in comparison with the legacy information.

FIG. 15(a) illustrates a specific display device is inclined at a predetermined angle θ1 or θ2 based on a reference surface of at least one display device constituting the digital signage system. Further, it is assumed that the display device is installed vertically based on the reference surface. The reference surface may be a ground or a predetermined space on the ground.

If the specific display device is inclined at a predetermined angle based on the reference surface as above, and if an element for angle compensation is included in the corresponding display device, the controller compensates for the angle in accordance with the element for angle compensation, and if not so, the controller can transmit a signal indicating that there is a problem such as failure related to angle compensation, to a system manager or a digital device such as a smart phone.

In addition, FIGS. 15(a) to 15(c) may be reviewed in another aspect. For example, the controller can control at least one or all of the display devices constituting the digital signage system to be inclined at a predetermined angle based on the reference surface as shown. For example, as shown in FIG. 15(b) or 15(c), if the digital signage system is provided on a space such as ceiling, instead of the ground, the controller can appropriately change and control the angle in accordance with the reference or other event, image which will be displayed, that is, signage content. This is equally applied to when the digital signage system is provided on the ground as shown in FIG. 15(a).

Further, FIG. 16(a) illustrates that the controller displays a newly added display device on the UI/UX if the new display device is added to the digital signage system. FIG. 16(b) relates an embodiment that guide information is provided for convenience of arrangement or alignment of the newly added display device when the new display device is added to the digital signage system. In this way, if the guide information is provided, convenience in installing the display device may be provided to the system manager, installer, etc.

Next, FIG. 17 is a view illustrating an effect of apparent movement through display devices of a digital signage system according to one embodiment of the present invention. In particular, FIG. 17(a) illustrates apparent movement in which an image approaches to a reference in accordance with the passage of time, and FIG. 17(b) illustrates apparent movement in which an image is far away from a reference in accordance with the passage of time.

Figure 18:
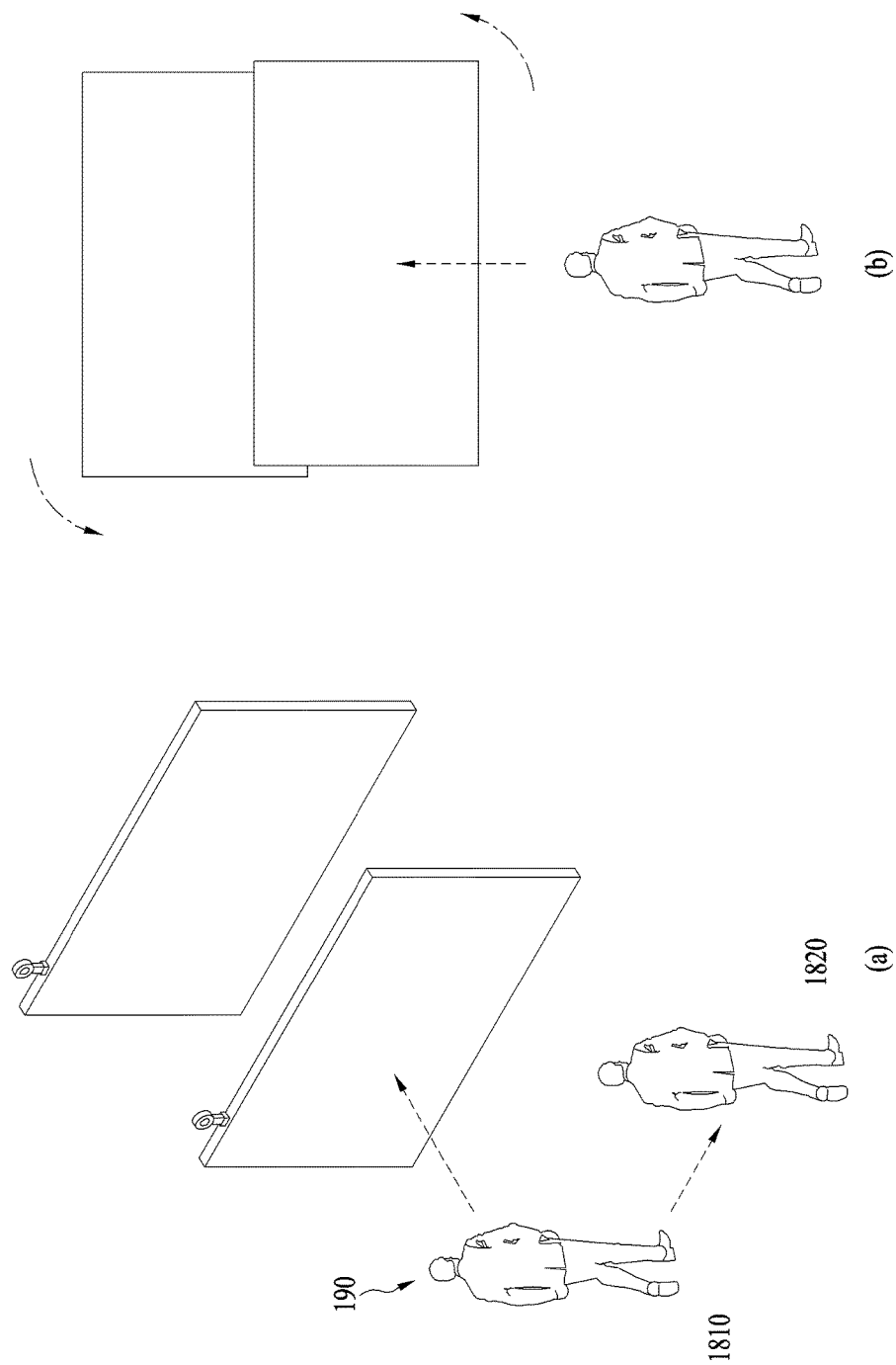
FIG. 18 is a view illustrating a method for controlling a display device of a digital signage system based on reference movement or change in accordance with one embodiment of the present invention.

FIG. 18 is a view illustrating a method for controlling a display device of a digital signage system based on reference movement or change in accordance with one embodiment of the present invention. According to an embodiment of the present invention, the controller of the server terminal controls up and down movement, left and right movement, rotation, etc. of at least one or all of the display devices randomly or in accordance with an event even though the display devices constituting the digital signage system are fixed on a predetermined space.

As shown in FIG. 18(a), if a user changes, that is, moves a signage content from a reference1 1810 to a position of a reference2 1820 through two display devices 1 and 2 while viewing a signage content, the controller determines whether the user continues to view the signage content, through the digital signage. Further, the controller can use data of a camera sensor provided in or attached to at least one display device or a sensor provided in the periphery of the other display device, if necessary, when determining the user's intention. Meanwhile, movement of the user from the reference1 1810 to the reference2 1820 may be recognized through the camera sensor or/and the sensor.

As a result of the determination, if it is determined that the user intends to continue to view the signage content, the controller can change the rotation angle of all or at least one of the display devices constituting the digital signage system and provide all or at least one of the display devices as shown in FIG. 18(b) to allow the user, who has moves to the reference2 1820, to easily view the display device.

Further, the controller can change the rotation angle for viewing convenience of the user who has moved the display device 2 closes to the reference instead of the sensor to the reference2 1820, unlike the aforementioned description, when determining the user's intention. Alternatively, as an example of control of the digital signage system in accordance with the determined result, the controller can add or finally control rotation change the other display device 1 in accordance with the user's response after controlling rotation change of the display device 2 closest to the reference.

In addition, if the user moves from the reference1 1810 to a reference opposite to the reference1 1810, for example, the controller can reversely control the display devices in the sequential order of the signage content without controlling rotation of the display devices. For example, when there is a user in the reference1, the controller can control the signage content displayed in the order of the display device 1→the display device 2 to be displayed in the order of the display device 2→the display device 1 if the user moves to the reference of the opposite position. Meanwhile, in this control case, the controller can set the spatial interval and the time interval reversely or differently depending on the image display order change.

In addition, if rotation of the display devices is controlled in response to the user's movement, the spatial interval and time interval applied to the display devices constituting the digital signage system prior to the movement may be applied as they are, or may be reset and newly set.

Figure 19:
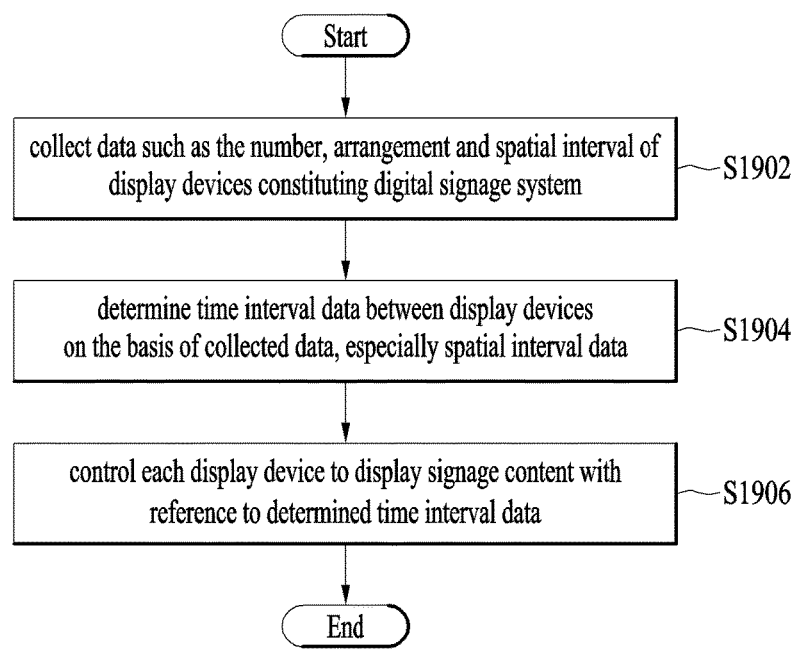
FIG. 19 is a flow chart illustrating a data processing method in a digital signage system according to one embodiment of the present invention.

Next, FIG. 19 is a flow chart illustrating a data processing method in a digital signage system according to one embodiment of the present invention. The controller of the server terminal collects data such as the number, arrangement and spatial interval of display devices constituting the digital signage system (S1902).

The controller determines time interval data between the display devices based on the collected data, especially spatial interval data (S1904). The controller controls the signage content to be displayed on each display device with reference to the determined time interval data (S1906).

Figure 20:
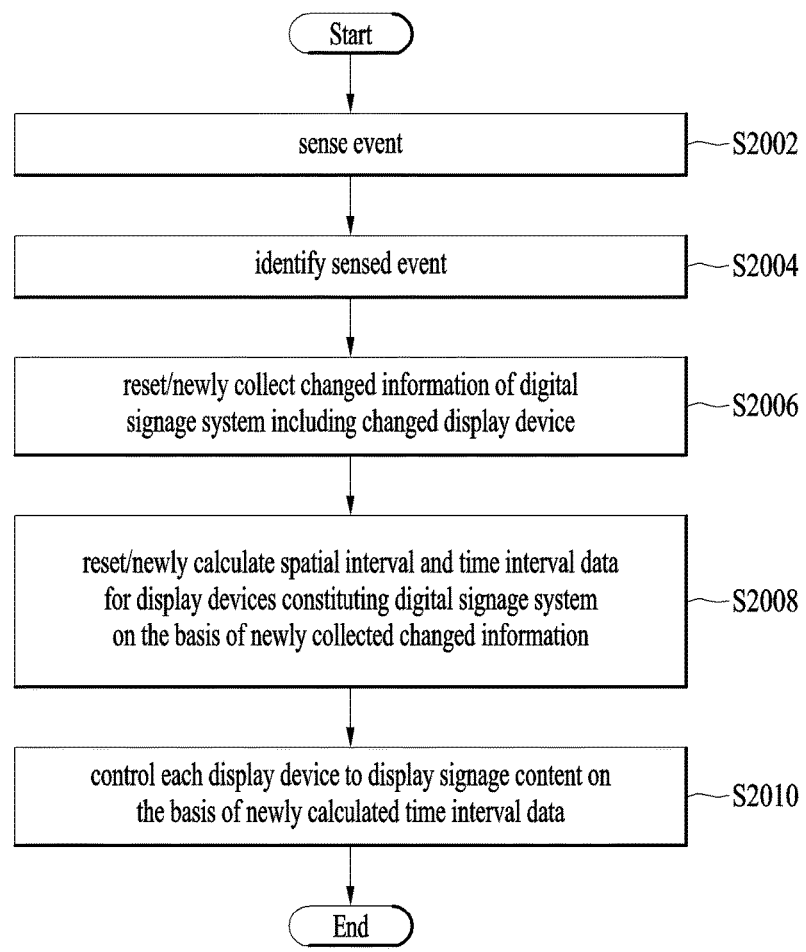
FIG. 20 is a flow chart illustrating a method of processing a predetermined event occurring in a control process of data processing in a digital signage system according to one embodiment of the present invention.

FIG. 20 is a flow chart illustrating a method of processing a predetermined event occurring in a control process of data processing in a digital signage system according to one embodiment of the present invention. The controller senses an event (S2002), and identifies the sensed event (S2004).

The controller resets information on the change of the digital signage system including the display device having a change in accordance with the identified event and newly collects the information (S2006). The controller resets spatial interval and time interval data of the display devices constituting the digital signage system based on the newly collected information on the change of the digital signage system and newly calculates the data (S2008). The controller controls display of the signage content on each display device based on the newly calculated time interval data (S2010).

The digital signage system according to one embodiment of the present invention comprises a plurality of display devices for displaying the signage content, and a server, wherein the server includes a communication unit for transmitting signage content data to each display device, a sensor unit for sensing movement of the plurality of display devices, and a controller for controlling the display devices of which display areas are overlapped, differently from each other based on the sensed movement data of the display devices, if display areas of at least two of the plurality of display devices are overlapped with each other at a predetermined threshold value or more.

In this instance, the controller can control the first display device of the plurality of display devices to output the signage content, which is being previously output, as it is and control the second display device to perform a light shielding function. Alternatively, the controller can control the first display device of the plurality of display devices to output at least one object of the signage content, which is being previously output, by fixing an absolute position of an image displayed on the display device regardless of the sensed movement data and differently output the other object based on the sensed movement data, and controls the second display device to perform a light shielding function. The controller can apply split-depth effect to the signage content of the plurality of display devices if the overlapped display areas are the threshold value or more.

Also, the controller can control the luminance of the overlapped display areas of each display device to control a luminance difference with the display areas which are not overlapped, within a predetermined range. If the display areas are overlapped at the predetermined threshold value or more, the controller can control the luminance of each display device by using the lamp unit. The controller can control at least one of the luminance and resolution of each display device before and after the display areas are overlapped at the predetermined threshold value or more, or controls a display time interval between the display devices of which display areas are overlapped at the predetermined threshold value or more, within a preset time. Meanwhile, at least one of the plurality of display devices may be a one-way mirror including transparent OLED (TOLED) or a mirror including an infinite mirror.

The digital signage system according to another embodiment of the present invention includes a plurality of display devices (only a first display device of the plurality of display devices may display an image in a first mode) of which display areas are arranged to be overlapped, and a server, where the server includes a sensor unit, a communication unit for transmitting image data to at least one of the display devices, and a controller for controlling an image data display time of each display device to allow an image data display time interval of each display device to reach a value less than a predetermined threshold value if the first mode is changed to a second mode as a result of sensing of the sensor unit.

In this instance, the first display device may be a one-way mirror including transparent OLED (TOLED), and the other display device except the first display device may be a mirror including an infinite mirror. At least one of the plurality of display devices may be a transparent display device.

Also, the predetermined threshold value of the time interval may be 40 ms or less which is the display time interval between adjacent display devices of the plurality of display devices. The image data may be still image data or moving image data. Also, the controller can control at least one of the brightness, resolution and audio volume level of the display devices in the second mode differently from the first mode.

According to at least one of the aforementioned embodiments of the present invention, the digital signage system that provides a stereoscopic signage content having depth and the immersion level may be provided unlike the related art digital signage system that only provides two-dimensional signage information. The digital signage system according to an embodiment of the present invention may actively control the digital signage by controlling the signage content in response to various events such as movement of the display devices, and may be implemented as above to maximize the effect of the digital signage.

The features, structures, effects, etc. described in the aforementioned embodiments are included in, but not limited to, at least one embodiment of the present invention. Moreover, the features, structures, effects, etc. described in the embodiments can be performed by those skilled in the art to which the embodiments pertain through combination or modification. Therefore, the descriptions related to the combination and modification should be construed to be included in the scope of the present invention.

Also, although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. The scope of the invention should be determined by reasonable interpretation of the appended claims and all change which comes within the equivalent scope of the invention are included in the scope of the invention.

What is claimed is:

1. A digital signage system comprising:
    a first display device;
    a second display device arranged a first spatial distance from the first display device, wherein the second display device has a display screen that at least partially overlaps a display screen on the first display device; and
    a controller configured to:
    control the first display device to display single image data at a first time, and
    control the second display device to display the single image data at a second time based on the first spatial distance between the first display device and the second display device, wherein at least one of the first display device or the second display device is a transparent display, and
    wherein the controller is further configured to:
    detect a third display device being different from the first and second display devices and having a display screen that at least partially overlaps the display screen on the second display device has been positioned between the first display device and the second display device,
    determine a second spatial distance between the first display device and the third display device, and a third spatial distance between the third display device and the second display device,
    control the first display device to display the single image data at the first time,
    control the third display device to display the single image data at a third time based on the second spatial distance, and
    control the second display device to display the single image data at a fourth time based on the third spatial distance.

2. The digital signage system according to claim 1, wherein the first spatial distance is equal to the second spatial distance.

3. The digital signage system according to claim 1, wherein the first spatial distance is not equal to the second spatial distance.

4. The digital signage system according to claim 1, wherein the controller is further configured to:
control the first display device to display the single image data with a first size on a position of the display screen of the first display device, and
control the second display device to display the single image data with the first size on a same corresponding position of the display screen of the second display device.

5. The digital signage system according to claim 1, wherein the controller is further configured to:
control the first display device to display the single image data with a first size on a position of the display screen of the first display device, and
control the second display device to display the single image data with a second size on a same corresponding position of the display screen of the second display device.

6. The digital signage system according to claim 1, wherein the controller is further configured to:
control the first display device to display the single image data with a first size on a position of the display screen of the first display device, and
control the second display device to display the single image data with a second size on a different corresponding position of the display screen of the second display device.

7. The digital signage system according to claim 1, wherein the controller is further configured to:
change the first spatial distance between the first display device and the second display device.

8. The digital signage system according to claim 1, wherein at least one of the first display device and the second display device includes a lamp unit, and
wherein the controller is further configured to differently control a brightness of the first display device and the second display device using the lamp unit.

9. The digital signage system according to claim 8, wherein the controller is further configured to control the lamp unit to emit light when the single image data is displayed.

10. The digital signage system according to claim 8, wherein when the first display device is farther from a reference than the second display device, the controller is further configured to control the lamp unit of the first display device to be darker than the second display device.

11. The digital signage system according to claim 1, wherein the controller is further configured to:
detect the first spatial distance between the first display device and the second display device is changed, and
control the second display device to display the single image data at a third time based on the changed spatial distance between the first display device and the second display device.

12. The digital signage system according to claim 1, wherein the controller is included in a server of the digital signage system.

13. The digital signage system according to claim 1, wherein the first display device and the second display device are aligned in series from a reference such that the display screen of the second display device at least partially overlaps the display screen on the first display device.

14. The digital signage system according to claim 1, wherein the first display device has a first size and the second display device has a second size different than the first size.

15. The digital signage system according to claim 1, wherein the first display device located farthest from a reference is not the transparent display and the second display device closest to the reference is the transparent display.

16. A method of controlling a digital signage system including a first display device and a second display device arranged a first spatial distance from the first display device, wherein the second display device has a display screen that at least partially overlaps a display screen on the first display device, the method comprising:
controlling the first display device to display single image data at a first time;
controlling the second display device to display the single image data at a second time based on the first spatial distance between the first display device and the second display device;
detecting a third display device being different from the first and second display devices positioned between the first display device and the second display device, wherein the third display device has a display screen that at least partially overlaps the display screen on the second display device;
determining a second spatial distance between the first display device and the third display device, and a third spatial distance between the third display device and the second display device;
controlling the first display device to display the single image data at the first time;
controlling the third display device to display the single image data at a third time based on the second spatial distance; and
controlling the second display device to display the single image data at fourth time based on the third spatial distance,
wherein at least one of the first display device or the second display device is a transparent display.

* * * * *